US011757209B2

(12) United States Patent
Vuillardot et al.

(10) Patent No.: US 11,757,209 B2
(45) Date of Patent: Sep. 12, 2023

(54) FASTENING DEVICE

(71) Applicant: Tyco Electronics France SAS, Pontoise (FR)

(72) Inventors: Thomas Vuillardot, Pontoise (FR); Xavier Rouillard, Pontoise (FR); Joseph Daher, Pontoise (FR); Francois Jodon de Villeroche, Pontoise (FR)

(73) Assignee: Tyco Electronics France SAS, Pontoise (FR)

( * ) Notice: Subject to any disclaimer, the term of this patent is extended or adjusted under 35 U.S.C. 154(b) by 0 days.

(21) Appl. No.: 17/024,922

(22) Filed: Sep. 18, 2020

(65) Prior Publication Data

US 2021/0091486 A1  Mar. 25, 2021

(30) Foreign Application Priority Data

Sep. 20, 2019 (FR) ........................................ 1910376
Apr. 16, 2020 (FR) ........................................ 2003855

(51) Int. Cl.

| H01R 4/52 | (2006.01) |
| H01R 11/28 | (2006.01) |
| H01R 13/639 | (2006.01) |
| H01R 13/635 | (2006.01) |
| H01R 13/621 | (2006.01) |
| H01R 13/74 | (2006.01) |

(52) U.S. Cl.
CPC ............... *H01R 4/52* (2013.01); *H01R 11/28* (2013.01); *H01R 13/621* (2013.01); *H01R 13/635* (2013.01); *H01R 13/639* (2013.01); *H01R 13/741* (2013.01)

(58) Field of Classification Search
None
See application file for complete search history.

(56) References Cited

U.S. PATENT DOCUMENTS

| 3,542,988 | A | * | 11/1970 | Baldasare | ................ H01H 9/02 200/305 |
| 4,771,141 | A | * | 9/1988 | Flumignan | ............. H01H 13/58 200/528 |
| 4,837,410 | A | * | 6/1989 | Martin | ................ H01H 13/023 200/314 |
| 6,030,722 | A | | 2/2000 | Kuboshima et al. | |
| 7,087,143 | B1 | * | 8/2006 | Schmidt | ................... C25D 7/12 118/416 |
| 2004/0192120 | A1 | | 9/2004 | Schmid et al. | |
| 2005/0269241 | A1 | * | 12/2005 | Brooks | ............. H01L 21/67386 206/710 |

(Continued)

FOREIGN PATENT DOCUMENTS

| CA | 2681233 A1 * 3/2010 |
| EP | 2830161 A1  1/2015 |

(Continued)

OTHER PUBLICATIONS

French Preliminary Report, dated Feb. 5, 2021, 9 pages.

*Primary Examiner* — Jean F Duverne
(74) *Attorney, Agent, or Firm* — Barley Snyder

(57) ABSTRACT

A fastening device for fastening an electrical terminal to an electrically conducting post includes a spring and a locking device retaining the electrical terminal on the electrically conducting post in a locked position of the fastening device. The spring is at least partially loaded in the locked position.

23 Claims, 20 Drawing Sheets

(56) References Cited

U.S. PATENT DOCUMENTS

| | | | |
|---|---|---|---|
| 2013/0090000 A1 | 4/2013 | Zhao | |
| 2015/0229065 A1* | 8/2015 | Buehman | H01R 13/70 |
| | | | 439/137 |
| 2018/0331457 A1* | 11/2018 | De Renzis | H01R 13/516 |

FOREIGN PATENT DOCUMENTS

| | | | |
|---|---|---|---|
| FR | 2882196 A1 | | 8/2006 |
| JP | 3646922 | * | 5/2005 |
| JP | 201707862 | * | 5/2017 |
| WO | 2016168389 A1 | | 10/2016 |

* cited by examiner

FASTENING DEVICE

CROSS-REFERENCE TO RELATED APPLICATIONS

This application claims the benefit of the filing date under 35 U.S.C. § 119(a)-(d) of French Patent Application No. 1910376, filed on Sep. 20, 2019, and French Patent Application No. 2003855, filed on Apr. 16, 2020

FIELD OF THE INVENTION

The present invention relates to a fastening device and, more particularly, to a fastening device for fastening an electrical terminal to an electrically conducting post.

BACKGROUND

Particularly in the field of automobiles, it may be necessary for several electrical cables to be fixed to a support, in general metallic, in order to provide a contact, for example in the case of a connection to earth. In this regard, it is known to connect each electrical cable to an electrical terminal comprising a through hole, in particular by crimping. The through hole of the electrical terminal is provided so that an electrically conducting post (or a cylindrical screw) which is welded to a support can pass through it. A nut is then screwed onto the post in order to hold the electrical terminal in contact with the post. However, the operation of screwing the nut to the post can cause deficiencies in the quality, which in particular results from checking the tightening torque and the risk of slippage or shifting of the electrical terminals with respect to each other when screwing.

SUMMARY

A fastening device for fastening an electrical terminal to an electrically conducting post includes a spring and a locking device retaining the electrical terminal on the electrically conducting post in a locked position of the fastening device. The spring is at least partially loaded in the locked position.

BRIEF DESCRIPTION OF THE DRAWINGS

The invention will now be described by way of example with reference to the accompanying Figures, of which:

FIG. 18b is a perspective view of an assembled state of FIG. 18a;

FIG. 19b is a perspective view of an assembled state of FIG. 19a;

FIG. 21b is a top view of FIG. 21a;

FIG. 22b is a top view of FIG. 22a; and

FIG. 22c is a sectional side view of FIG. 22a.

DETAILED DESCRIPTION OF THE EMBODIMENT(S)

The invention will now be described in more detail using advantageous embodiments by way of example and with reference to the drawings. The embodiments described are simply possible configurations and it should be borne in mind that the individual features as described above may be provided independently of each other or may be omitted completely when implementing the present invention.

Figure 1:
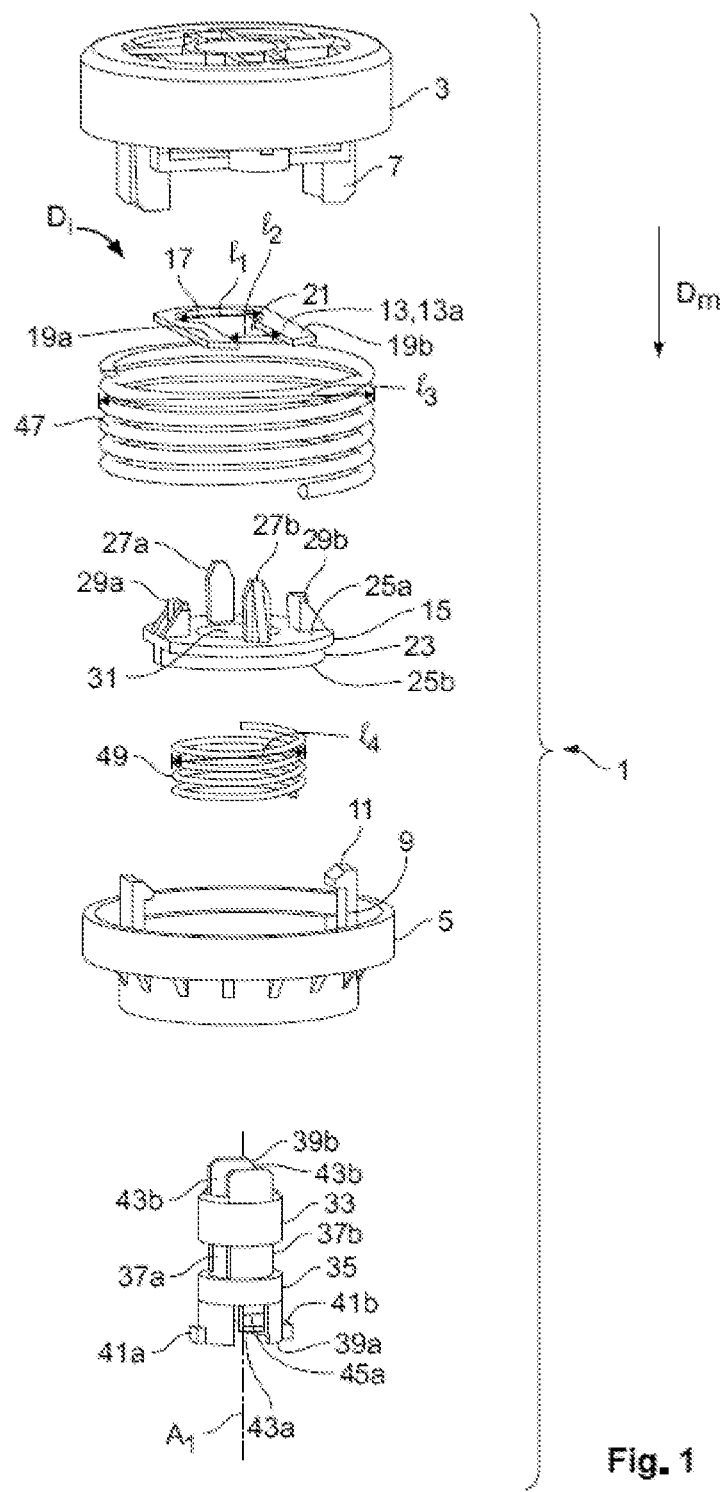
FIG. 1 is an exploded perspective view of a fastening device according to an embodiment.

A fastening device 1 according to an embodiment is shown in FIG. 1. The fastening device 1 comprises a cover 3 which can be snap fitted onto a base 5 in accordance with a mounting direction Dm of the fastening device 1. Snap fitting of the cover 3 to the base 5 is carried out by interlocking snap fitting elements 7 of the cover 3 with two shanks 9 provided with heads 11 in the form of hooks and protruding from the base 5.

The fastening device 1 further comprises a retaining circlip 13 and a locking part 15, as shown in FIG. 1. The retaining circlip 13 is resiliently deformable and is provided for insertion into the cover 3 in a sliding manner in an insertion direction Di, which is transverse to the mounting direction Dm. The retaining circlip 13 in accordance with the first embodiment of the invention is a flat strip 13a which is essentially in the shape of a "U". The retaining circlip 13 has a central portion 17 from which two flat and resilient arms 19a, 19b extend. The central portion 17 and the arms 19a, 19b define an open inner zone 21 between them. In the plane of the flat strip 13a and in a state where the retaining circlip 13 is not deformed, i.e. unstressed, the empty inner zone 21 has a shape which is substantially circular at the level of the central portion 17 and a substantially rectangular shape along the resilient arms 19a, 19b. Thus, a distance between each of the resilient arms 19a, 19b is longer at the level of the central portion 17 (distance 11) than the length of the remainder of the resilient arms 19a, 19b (distance 12). In a variation of the first embodiment, the retaining circlip 13 could have an arcuate shape, a semi-circular shape or a "V" shape.

The locking part 15 comprises a base 23 in the form of a flat ring, having a first surface 25a and a second surface 25b, opposite to the first surface 25a, as shown in FIG. 1. Four protuberances 27a-b, 29a-b protrude from the surface 25a in a direction opposite to the surface 25b. The four protuberances 27a-b, 29a-b are positioned on the surface 25a of the base 23 such that they are equidistant from each other. The four protuberances 27a-b, 29a-b each essentially have a triangular section. In the first embodiment of the invention, the protuberances 27a-b are longer than the protuberances 29a-b. The protuberances 27a-b have a guiding function during assembly of the fastening device 1, as will be described in more detail below, while the protuberances 29a-b have the function of locking the retaining circlip 13, as will be described in more detail with reference to FIGS. 4a, 5a and 6a. The locking part 15 has a through hole 31 with a circular section. The dimensions of the locking part 15 are such that it can be housed between the cover 3 and the base 5.

The fastening device 1, as shown in FIG. 1, comprises a hollow shank 33 with a section which is essentially circular. The hollow shank 33 is formed by a lateral wall 35 which extends along a longitudinal central axis A1 of the hollow shank 33. Along the longitudinal central axis A1, the lateral wall 35 comprises two openings 37a, 37b which are diametrically opposed with respect to each other. At a first end 39a of the hollow shank 33 are two lugs 41a, 41b protruding from the lateral wall 35 towards the exterior of the hollow shank 33 in accordance with a direction perpendicular to the longitudinal central axis A1. The lugs 41a, 41b are fastening lugs which enable assembly with the base 5 by snap fitting. The first end 39a, as well as a second end 39b opposite to the first end 39a, each comprise two notches 43a-b which are diametrically opposed with respect to each other. The notches 43a at the level of the first end 39a each comprise a retaining strip 45a which protrudes from the notch 43a along the longitudinal central axis A1 towards the first end 39a of the hollow shank 33.

The fastening device 1 in accordance with the present invention comprises a first spring 47 and a second spring 49, as shown in FIG. 1. The first spring 47 and the second spring 49 are compression springs. The first spring 47 has a diameter 13 which is greater than the diameter 14 of the second spring 49. In the first embodiment, the first spring 47 and the second spring 49 are compression springs which are cylindrical and helical.

In a variation, the fastening device 1 may comprise one or more cylindrical multi-turn wave springs or leaf springs. In another variation, the first spring 47 could be a spring of a different type to that of the second spring 49, for example a first cylindrical multi-turn wave spring and a second helical spring. The first spring 47 and the second spring 49 could be springs with the same strength, or springs with a different strength. In yet another variation, the fastening device 1 may comprise three or more springs.

The fastening device 1 is described in more detail below by means of FIG. 2, which represents a sectional view of the fastening device 1 in an assembled but not locked state. The elements with the same reference numerals already used in FIG. 1 will not be described again in detail, but reference should be made to their description above. The structures of the cover 3 and of the base 5 shown by the sectional view of FIG. 2 will be described in more detail below.

Figure 2:
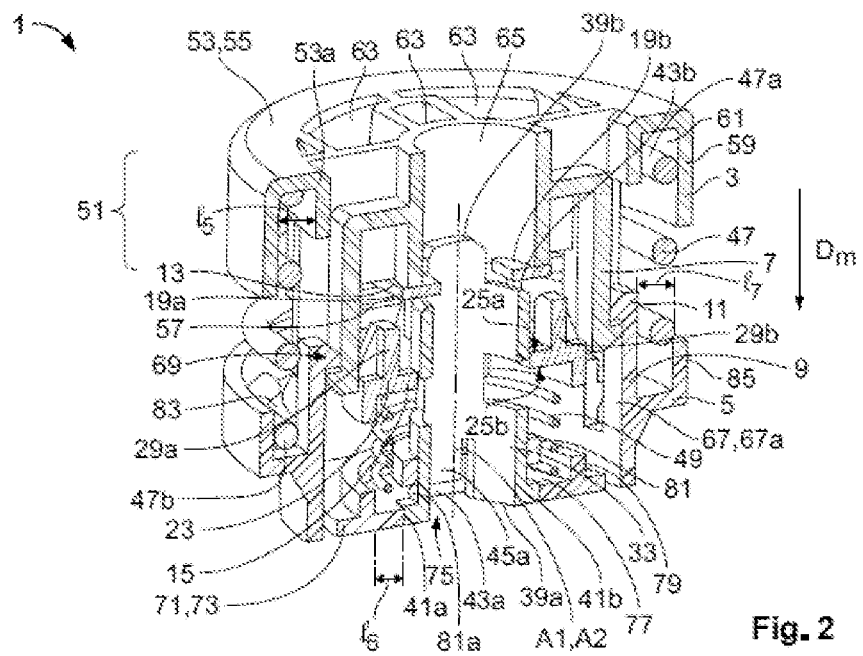
FIG. 2 is a sectional perspective view of the fastening device of FIG. 1 in an assembled state.

As shown in FIG. 2, the cover 3 comprises a portion 51 with an essentially cylindrical shape. A first base plate 53 of the cylindrical portion 51 is a press surface 55 of the fastening device 1. A second base 57, opposite to the first base 53, is provided with snap fitting elements 7 which protrude perpendicularly from the second base 57 in a direction opposite to the first base 53. A lateral wall 59 extends perpendicularly from the first base 53 towards the second base 57 in a manner such as to define an annular groove 61 along an outer circumference 53a of the first base 53. The annular groove 61 has a width 15 adapted to receive the first spring 47. The cover 3 comprises a plurality of voids 63 which extend from the first base 53, in order to lighten the structure of the cover 3. In addition, a through hole 65 with a circular section passes through the cover 3 from one side to the other, i.e. from the first base 53 to the second base 57.

The base 5, as shown in FIG. 2, has a portion 67 with an essentially cylindrical shape. The cylindrical portion 67 is defined by a lateral wall 67a which extends about a longitudinal central axis A2 of the cylindrical portion 67. The cylindrical portion 67 has a first open end 69, and a second end 71, opposite to the first end 69. The second end 71 comprises a flat bottom 73. A through hole 75 with a circular section which is centred on the longitudinal axis A2 of the cylindrical portion 67 of the base 5 passes through the bottom 73 of the second end 71 of the base 5. The bottom 73 of the second end 71 is furthermore provided with a first annular groove 77, defined by a first lateral wall 79 and a second lateral wall 81, the second lateral wall 81 protruding from the perimeter of the through hole 75. The first annular groove 77 has a width 16 adapted to house the second spring 49 therein. The base 5 has a second annular groove 83 defined by the lateral wall 67a of the cylindrical portion 67 and an annular circular trough 85. The second annular groove 83 has a width 17 which is adapted to house the first spring 47 therein.

The cover 3, the base 5, the locking part 15 and the hollow shank 33 are produced from a plastic material. The elements 3, 5, 15 and 33 may, in an embodiment, be produced by injection moulding.

Assembly of the fastening device 1 illustrated in FIG. 2 will now be described below.

In the assembled but not locked state of the fastening device 1 illustrated in FIG. 2, the hollow shank 33 is interlocked with the flat surface 73 at the level of the through hole 75 of the base 5, on which the hollow shank 33 is retained by fastening lugs 41a-b and retaining strips 45a. The fastening lugs 41a-b and the retaining strips 45a are snap fitted into corresponding openings 81a of the second lateral wall 81 of the base 5 protruding from the perimeter of the through hole 75. The first spring 47 is positioned in the second annular groove 83 of the base 5. The second spring 79 is fitted onto the hollow shank 33 in a manner such as to be centred on the longitudinal central axis A1 of the hollow shank 33. The second spring 79 is positioned in the first annular groove 77 of the base 5.

The locking part 15 is fitted onto the hollow shank 33, as shown in FIG. 2, at the level of its through hole 31. The surface 25b of the base 23 of the locking part 15 is in contact with the second spring 79.

The retaining circlip 13 is inserted in a sliding manner into the cover 3 in an insertion direction Di, which is transverse to the mounting direction Dm. The two flat and resilient arms 19a, 19b of the retaining circlip 13 extend either side of the through hole 65 of the cover 3, and partially extend into the through hole 65. In the assembled but not locked state of the fastening device 1 illustrated in FIG. 2, the retaining circlip 13 is unstressed and is not in a deformed state.

The cover 3 onto which the retaining circlip 13 has been inserted is mounted with the rest of the fastening device 1 in the mounting direction Dm shown in FIG. 2. One end 47a of the first spring 47 is thus positioned in the annular groove 61 of the cover 3, while a second end 47b of the first spring 47, opposite to the first end 47a, is positioned in the annular groove 83 of the base 5. Snap fitting of the cover 3 to the base 5 is carried out by interlocking snap fitting elements 7 of the cover 3 with two shanks 9 provided with heads 11 in the form of hooks and protruding from the base 5. Snap fitting the cover 3 onto the base 5 thus produces a compartment in which the first spring 47 and the second spring 49 are housed and retained. During snap fitting of the cover 3 to the base 5, the protuberances 27a and 27b of the locking part 45 slide in corresponding openings (not visible in FIGS. 1 and 2) of the cover 3 in order to guide the two elements 3 and 5 together. Because assembly of the fastening device 1 is carried out by snap fitting, this enables manual, simple and tool-free assembly of the fastening device 1.

FIGS. 3-6 represent successive steps of a method for fastening at least one electrical terminal on an electrically conducting post with the fastening device 1 in accordance with the first embodiment. The elements with the same reference numerals already used in FIGS. 1 and 2 will not be described again in detail, but reference should be made to their description above.

Figure 3:
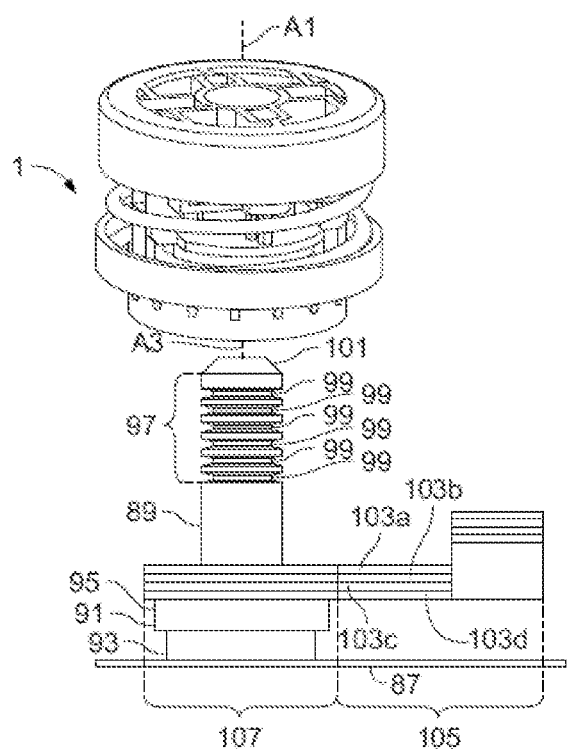
FIG. 3 is a perspective view of a first step of a method for fastening an electrical terminal to an electrically conducting post by the fastening device of FIG. 1.

FIG. 3 shows a metal support 87 which may, for example, be the bodywork of a vehicle, onto which an electrically conducting post 89 is welded. The post 89 is essentially cylindrical in shape. At the level of one end 91, the post 89 has a head plate 93 adapted to be welded to the support 87. The head plate 93 of the post 89 comprises a collar 95. The post 89 is provided with a portion 97 comprising annular grooves 99. One end 101 of the post, opposite to the end 91 of the post 89, is chamfered.

As can be seen in FIG. 3, four electrical terminals 103a-d, which are known in the art, are fitted onto the post 89 and come into abutment with the collar 95 of the post 89. The number of electrical terminals 103a-d is not limited to four. It should be noted that the fastening device 1 can be used to fasten any type of flat terminal irrespective of their number and their configuration, because the fastening device 1 is compatible with all thicknesses of flat terminals. In the example shown in FIG. 3, the electrical terminals 103a-d are ring terminals comprising a first portion 105 to which an electrical cable is intended to be connected and a second portion 107 provided with a through hole through which a post can pass. In a variation, the electrical terminals 103a-d are fork electrical terminals.

In the first step of the method illustrated in FIG. 3, the fastening device 1 is in an assembled position which is not locked. The fastening device 1 is brought close to the post 89 in a manner such as to align a longitudinal central axis A3 of the post 89 with the longitudinal central axis A1 of the hollow shank 33 of the fastening device 1.

Figure 4:
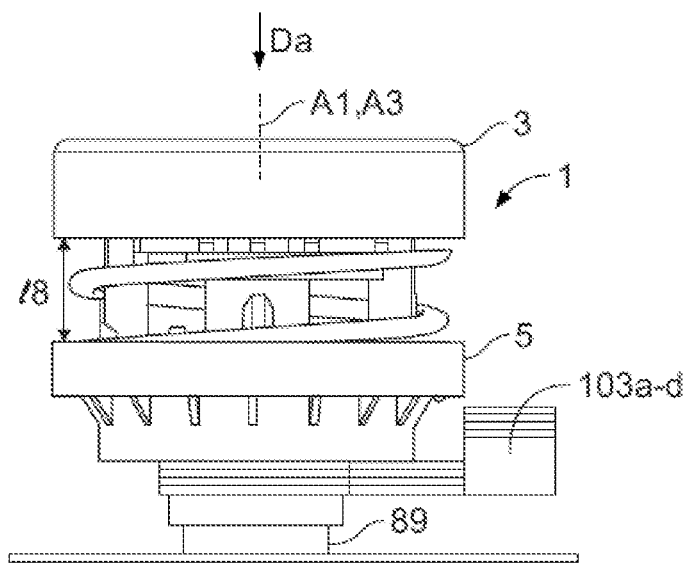
FIG. 4 is a side view of a second step of a method for fastening an electrical terminal to an electrically conducting post by the fastening device of FIG. 1.
Figure 4A:
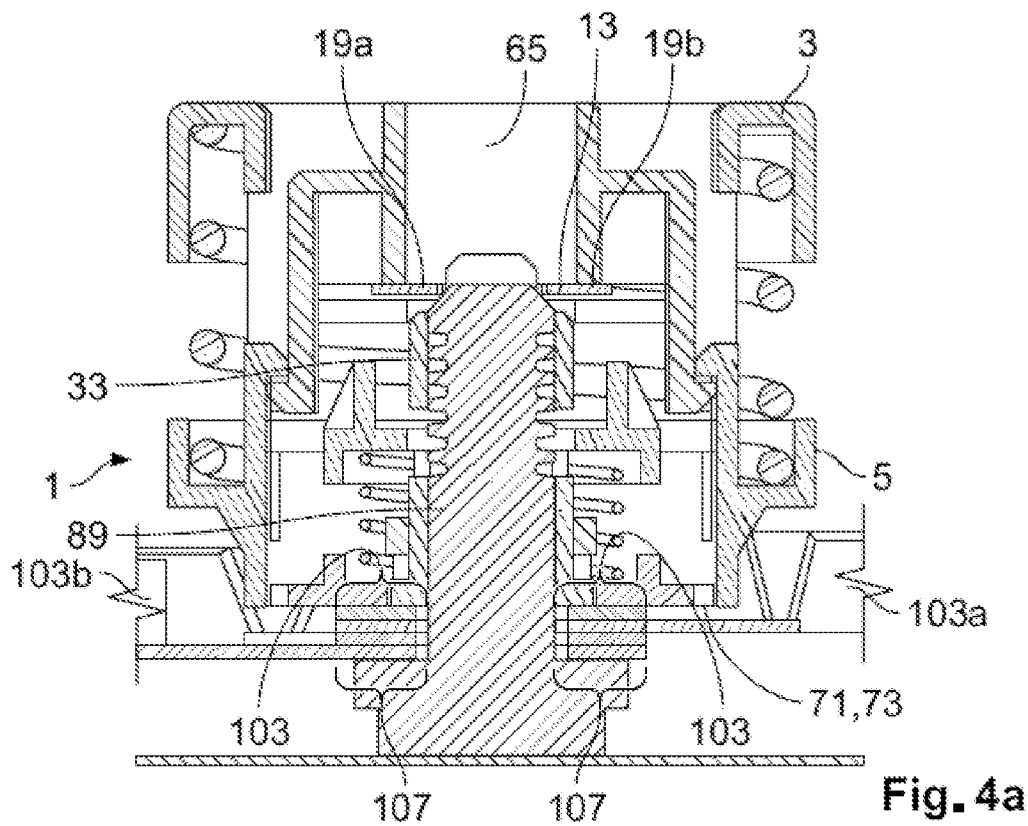
FIG. 4a is a sectional side view of FIG. 4.
Figure 4B:
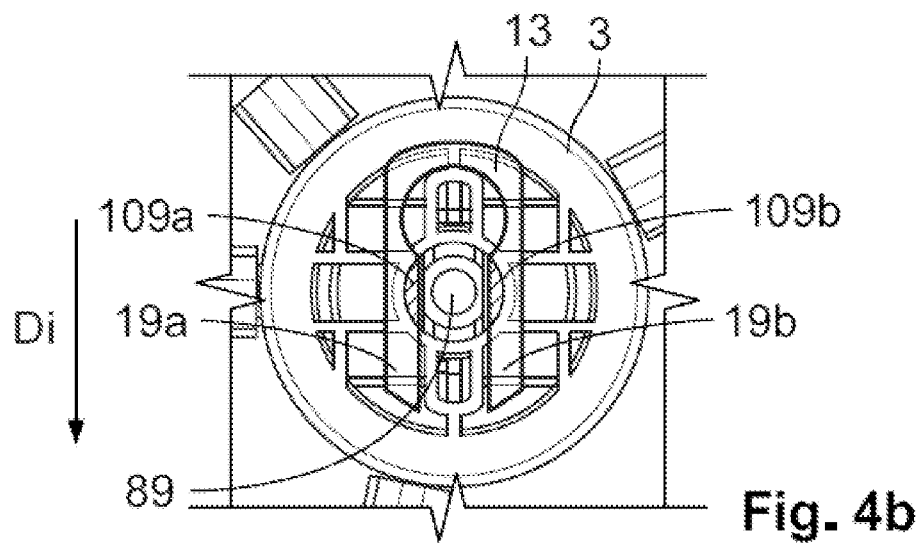
FIG. 4b is a top view of FIG. 4.

FIGS. 4, 4a and 4b represent the fastening device 1 assembled on the post 89 in a state which is not locked. As shown in FIG. 4, the fastening device 1 has been fitted onto the post 89 in an assembly direction Da, parallel to the longitudinal central axis A3 of the post 89.

As shown in FIG. 4a, the post 89 is housed in the hollow shank 33 of the fastening device 1. A portion 103 of the bottom 73 of the base 5 bears on the second portion 107 of the electrical terminals 103a-d. The portion 103 is in direct contact with the second portion 107 of the electrical terminal 103a. In this step of the method, where the fastening device 1 has not yet been locked, the electrical terminals 103a-d can still be radially displaced about the longitudinal central axis of the post A1.

In this step, the first spring 47 and the second spring 49 are unstressed, i.e. they are neither loaded nor compressed. In the unstressed state of the springs 47, 49, the cover 3 and the base 5 are spaced from each other by a distance with length 18, as shown in FIG. 4.

The sectional view of FIG. 4a and the top see-through view of FIG. 4b illustrate the position of the retaining circlip 13 in this step of the method, in which the fastening device 1 has not yet been locked. FIG. 4a shows that the resilient arms 19a, 19b of the retaining circlip 13 are positioned at the height of the chamfered portion of the end 101 of the post 89. The hatched zones 109a-b shown in FIG. 4b indicate the portions 109a-b of the resilient arms 19a-b which partially extend into the through hole 65 of the cover 3. FIG. 4b also demonstrates that in the assembled state of the fastening device 1, the retaining circlip 13 is inserted into corresponding grooves of the cover 3 in accordance with the insertion direction Di in a manner such that the flat strip 13a is parallel to the press surface 55 of the cover 3.

Figure 5:
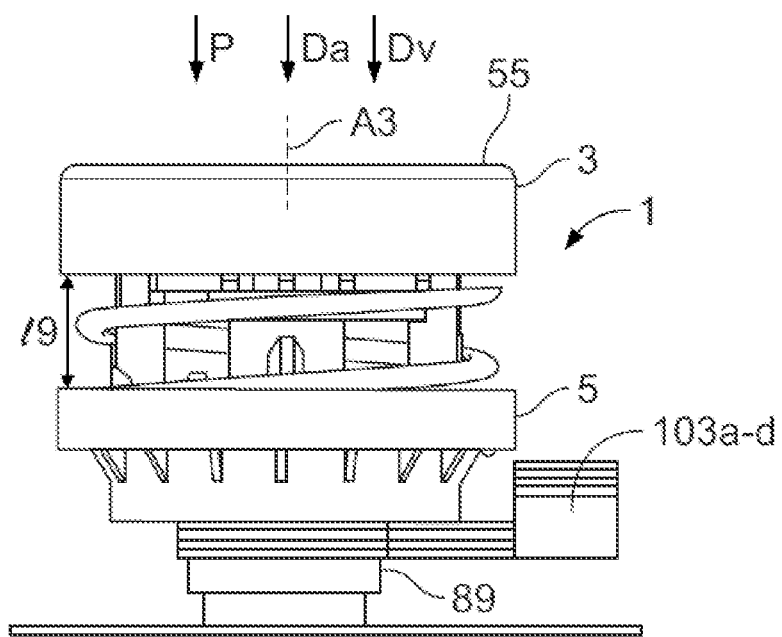
FIG. 5 is a side view of a third step of a method for fastening an electrical terminal to an electrically conducting post by the fastening device of FIG. 1.
Figure 5A:
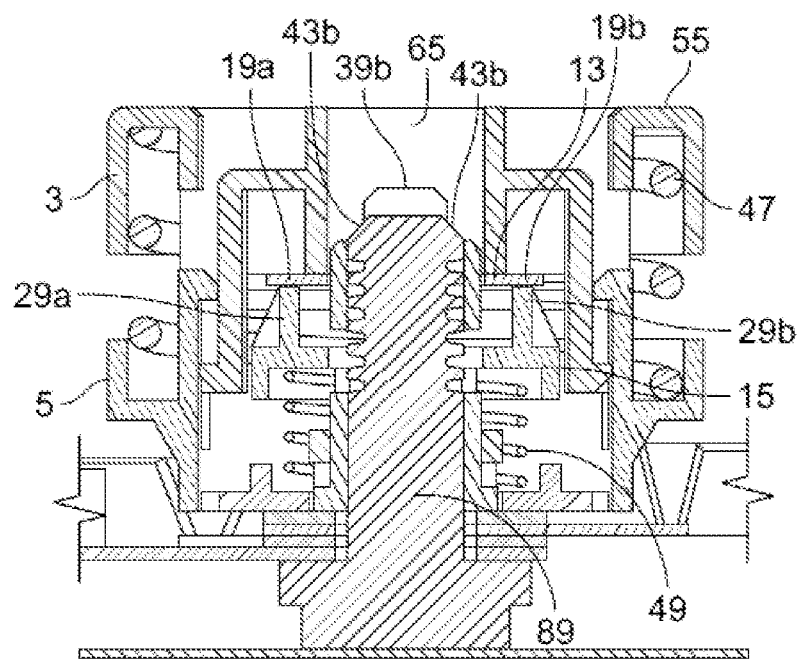
FIG. 5a is a sectional side view of FIG. 5.
Figure 5B:
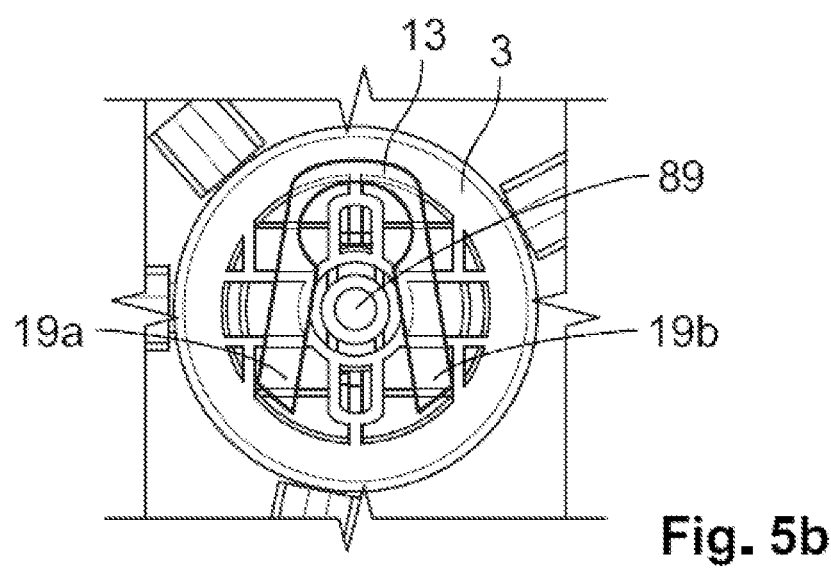
FIG. 5b is a top view of FIG. 5.

FIGS. 5, 5a and 5b represent the fastening device 1 assembled on the post 89 in an intermediate state between a state which is not locked and a locked position. In the step shown in FIG. 5, a push force P is applied to the press surface 55 of the cover 3 of the fastening device 1. The push force P is applied in a locking direction Dv, which is parallel to the assembly direction Da and to the longitudinal central axis A3 of the post 89. The pressure P exerted on the press surface 55 causes compression of the first spring 47 and of the second spring 49. Thus, the distance 19 between the cover 3 and the base 5 has been reduced compared with the distance 18 of the preceding step illustrated in FIG. 4 (18<19).

As can be seen in FIG. 5a, the pressure P exerted on the press surface 55 has caused the cover 3 to be displaced towards the base 5, in a manner such that the hollow shank 33 in which the post 89 is housed partially engages in the through hole 65 of the cover 3. This displacement of the cover 3 causes an elastic deformation of the resilient arms 19a,19b of the retaining circlip 13 (illustrated in FIG. 5b) when the portions 109a-b of the resilient arms 19a, 19b come into abutment against the notches 43b of the end 39b of the hollow shank 33 under the applied pressure P.

FIG. 5b illustrates the elastic deformation of the resilient arms 19a, 19b of the retaining circlip 13 which are further away from each other compared with an unstressed position of the circlip 13, as can be seen in FIG. 4b. In this intermediate state of the method illustrated in FIG. 5a, the resilient arms 19a, 19b of the retaining circlip 13 abut against the protuberances 29a, 29b of the locking part 15. Under the effect of the applied pressure P, the locking part 15 pushes the second spring 49, which is compressed.

Figure 6:
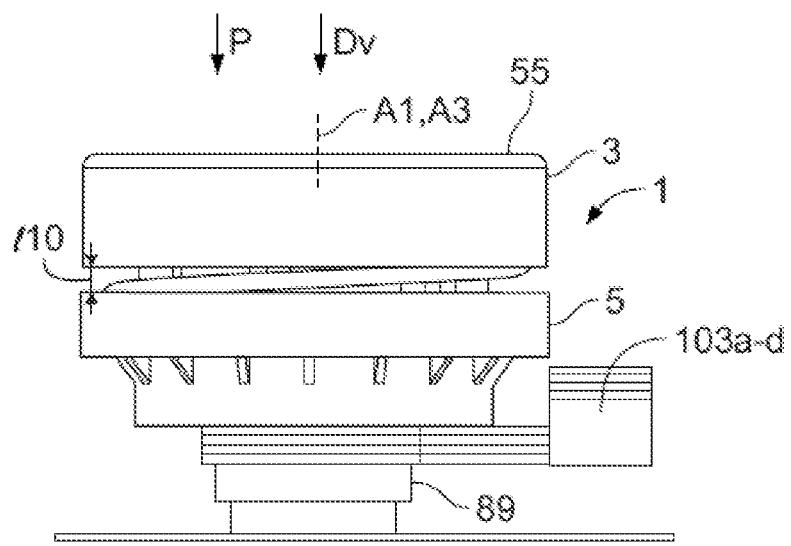
FIG. 6 is a side view of a fourth step of a method for fastening an electrical terminal to an electrically conducting post by the fastening device of FIG. 1.
Figure 6A:
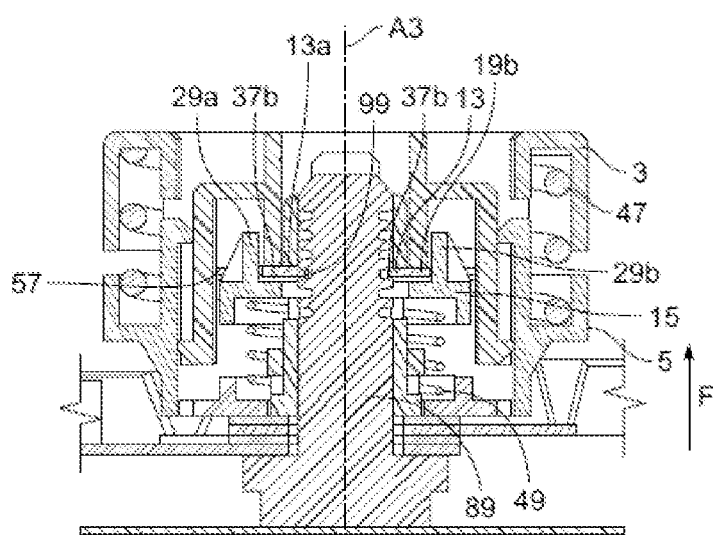
FIG. 6a is a sectional side view of FIG. 6.
Figure 6B:
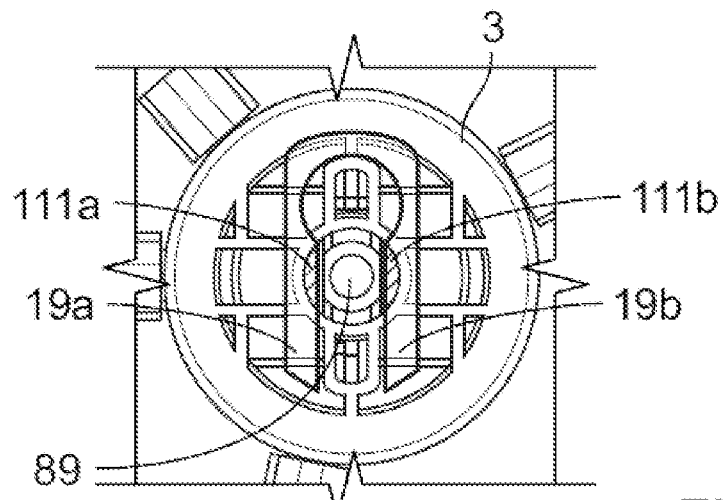
FIG. 6b is a top view of FIG. 6.

FIGS. 6, 6a and 6b represent the fastening device 1 assembled on the post 89 in a locked position. In the locked position, the electrical terminals are fixed on the post 89 by the fastening device 1 which is in a locked state. The pressure P exerted on the press surface 55 has caused the compression of the first spring 47 and of second spring 49 in a manner such that, in the locked position, the distance 110 between the cover 3 and the base 5 is smaller than the distances 18 and 19 illustrated in FIGS. 4 and 5 (18<19<110) representing the previous steps of the method.

In the locked position, the resilient arms 19a, 19b of the retaining circlip 13 are restored to their initial state, as in the step illustrated in FIG. 4b, i.e. they are no longer in a deformed state. Under the effect of the application of the pressure P on the press surface 55 which has compressed the springs 47, 49, the retaining circlip 13 has been displaced and housed in the locking part 15. The resilient arms 19a, 19b of the retaining circlip 13 are partially housed in the openings 37a, 37b of the hollow shank 33. The portions 111a, 111b of the resilient arms 19a, 19b housed in the openings 37a, 37b are indicated by the hatched zones 111a, 111b of FIG. 6b.

In the locked position, the resilient arms 19a, 19b are received in a groove 99 of the post 89. Thus, in the locked position, locking of the fastening device 1 is ensured by the retaining circlip 13 which is itself locked by the locking part 15. In fact, in the locked position, the retaining circlip 13 is immobilized between the base 25a and the protuberances 29a-b of the locking part 15, the bottom 57 of the cover 3 and the opening 37a, 37b of the hollow shank 33 of the fastening device 1. In addition, the locking part 15 is forced by the restoring force F exerted by the second spring 49 in a direction opposite to the locking direction Dv. The retaining circlip 13 can be immobilized in the openings 37a, 37b of the hollow shank 33 of the fastening device 1.

The first spring 47 exerts a pressure on the first portion 107 of the electrical terminals 103a-d, meaning that electrical contact between the electrical terminals 103a-103d and the post 89 can be ensured, in particular by pushing the electrical terminals 103a-103d against the collar 95 of the post 89. In the locked position, radial movement of the electrical terminals 103a-103d about the longitudinal central axis A3 of the post 89 is prevented by the fastening device 1 in accordance with the first embodiment of the invention.

The method for fastening at least one electrical terminal to an electrically conducting post by the fastening device 1 can be carried out in a simple manner and without tools. A step for screwing and a supplemental step for verifying the tightening torque of a nut on the post are thus not necessary. In addition, the locked position may be activated and reached manually by the press surface 55, with a single continuous movement by an operator. Such a fastening method can thus enable simple, easy and rapid locking. Furthermore, the fastening device 1 is compatible with flat electrical terminals of any thickness and configuration. A single fastening device 1 can be used to fasten a plurality of electrical terminals, in particular at least four electrical terminals.

The present invention also pertains to an assembly of the fastening device 1 and of the post 89 comprising at least one annular groove 99 adapted to receive the retaining circlip 13 of the fastening device 1 in the locked position.

Figure 7:
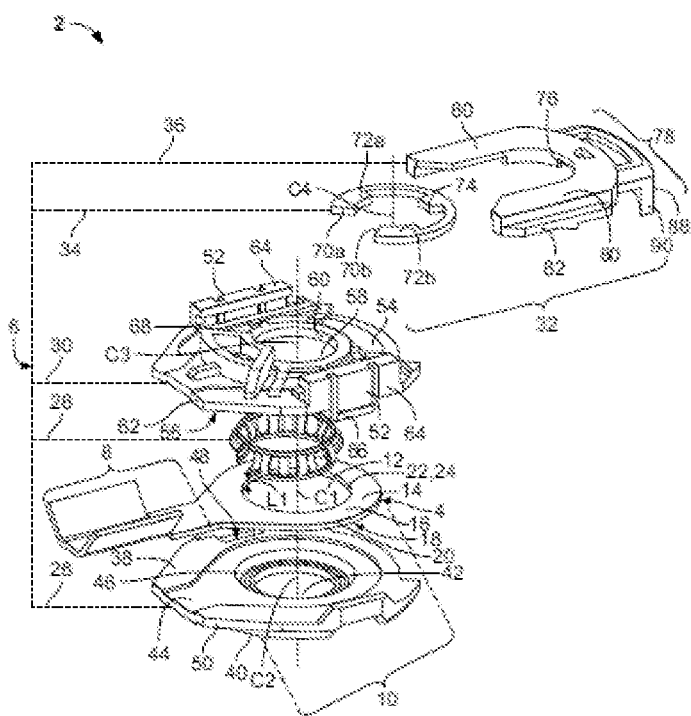
FIG. 7 is an exploded perspective view of a fastening assembly according to another embodiment.

A fastening assembly 2 according to another embodiment, as shown in FIG. 7, comprises an electrical terminal 4 and a fastening device 6.

The electrical terminal 4 has a shape which is known for electrical terminals of the prior art, such as electrical ring terminals, but wherein the dimensions are adapted to the fastening device 6. In the embodiment shown in FIG. 7, the electrical terminal 4 is a ring terminal comprising a first portion 8 which is intended to be connected to an electrical cable and a second portion 10 provided with a through hole 12 through which an electrical post can pass. Thus, the second portion 10 has the geometry of a flat ring 14. The dimensions of the flat ring 14 of the electrical terminal 4, in particular the thickness L1 of the flat ring 14, are adapted to the dimensions of the fastening device 6 in accordance with the second embodiment of the invention.

The flat ring 14, as shown in FIG. 7, comprises a first flat surface 16 and a second flat surface 18, opposite to the first flat surface 16 along a longitudinal central axis C1 of the through hole 12. The first surface 16 is connected to the second surface 18 by an outer lateral wall 20 and by an inner lateral wall 22. The inner lateral wall 22 corresponds to an inner lateral wall 24 of the through hole 12 of the electrical terminal 4. In a variation, the electrical terminal 4 is an electrical fork terminal.

As can be seen in FIG. 7, the fastening device 6 comprises a base 26, a spring 28, a cover 30 and a locking device 32 which itself comprises a retaining circlip 34 and a locking part 36. The base 26, the cover 30, and the locking part 36 are produced from a plastic material, in particular by injection moulding.

The base 26, as shown in FIG. 7, comprises a first surface 38 configured for receiving the electrical terminal 4, and a second surface 40 opposite to the first surface 38 which is intended to be positioned on the head of a post in an assembled state of the fastening assembly 2. A through hole 42 with a section which is substantially circular and with a longitudinal central axis C2 passes through the base 26 from the first surface 38 to the second surface 40. The first surface 38 of the base 26 comprises a housing void 44 with a geometry and dimensions which are adapted to be able to receive the second portion 10 of the electrical terminal 4. The through hole 42 of the base 26 has a shoulder 46 which partially extends from the first surface 38 towards the second surface 40. The shoulder 46 acts as an abutment for the spring 28. The spring 28 is a radial spring.

Figures 7A, 7B:
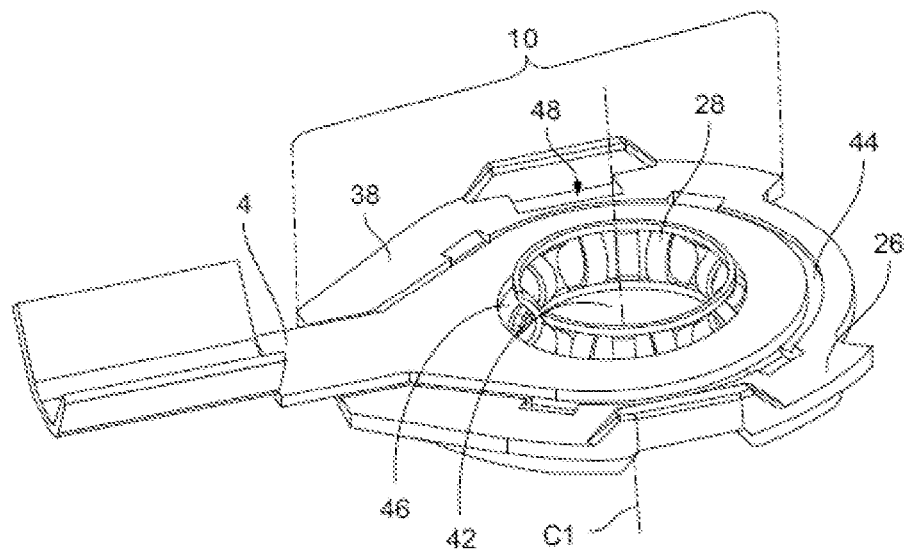
FIG. 7a is a perspective view of a spring in the fastening assembly of FIG. 7.
FIG. 7b is perspective view of a locking device of the fastening assembly of FIG. 7.

The housing of the second portion 10 of the electrical terminal 4 in the housing void 44 and the abutment for the spring 28 on the shoulder 46 of the base 26 are illustrated in FIG. 7a. In the pre-assembled state illustrated in FIG. 7a, the spring 28 is in a partially loaded state under the effect of the force exerted by the electrical terminal 4 which compresses the spring 28 radially with respect to the longitudinal central axis C1 of the electrical terminal 4. Thus, there is electrically conducting contact between the electrical terminal 4, and the radial spring 28, which itself is also electrically conducting. A restoring force of the spring 28 is transverse to the longitudinal central axis C1. The loaded state of the spring 28 will be described in more detail below with reference to FIG. 12.

The base 26 further comprises two retaining orifices 48, as shown in FIGS. 7 and 7a, with an essentially rectangular section along an outer lateral wall 50 of the base 26 connecting the first surface 38 to the second surface 40. The retaining orifices 48 of the base 26 are adapted to receive a respective retaining strip 52 of the cover 30.

The cover 30 comprises a first surface 54 configured for receiving the locking device 32 and a second surface 56, opposite to the first surface 54, which is provided in order to accommodate the second portion 10 of the electrical terminal 4, as shown in FIG. 7. A through hole 58 with a section which is substantially circular and with a longitudinal central axis C3 passes through the cover 30 from the first surface 54 to the second surface 56. The first surface 54 of the cover 30 is connected to the second surface 56 at the level of the through hole 58 via an inner lateral wall 60. The retaining strips 52 of the cover 30 are positioned along an outer lateral wall 62 which connects the first surface 54 to the second surface 56 of the cover 30. The retaining strips 52 each extend from a protuberance 64 which protrudes from the first surface 54 of the cover 30 in a direction opposite to the second surface 56. Each of the retaining strips 52 has a head 66 in the form of a hook adapted for snap fitting into the corresponding retaining orifices 48 of the base 26. The two protuberances 64 which extend from the first surface 56 of the cover 30 each further comprise a groove 68. The two protuberances 64 are disposed in a manner such that the grooves 68 are positioned so that they are parallel to each other and face each other.

The second surface 56 of the cover 30, which is not visible in FIG. 7, is essentially designed in the same manner as the first surface 38 of the base 26, i.e. the second surface 56 also comprises a housing void adapted to accommodate the second portion 10 of the electrical terminal 4 and a shoulder at the level of the through hole 58 adapted to accommodate the spring 28.

The fastening device 6 further comprises a locking device 32, shown in FIG. 7, which itself comprises a retaining circlip 34 which is provided for assembling with the locking part 36 by snap fitting. The retaining circlip 34 has the shape of a flat arc which is circular and has a longitudinal central axis C4. The retaining circlip 34 comprises two free ends 70a, 70b. Each of the free ends 70a, 70b comprises a flat protuberance 72a, 72b which protrudes towards the longitudinal central axis C4 in the plane of the flat retaining circlip 34. The retaining circlip 34 further comprises a flat protuberance 74 positioned equidistantly from the free ends 70a, 70b and which protrudes towards the longitudinal central axis C4 in the plane of the flat retaining circlip 34. The protuberance 74 of the retaining circlip 34 can be snap fitted into a corresponding notch 76 of the locking part 36.

The locking part 36 is essentially in the shape of a "U", as shown in FIG. 7. The locking part 36 comprises a central portion 78 from which extend two arms 80 which are parallel to each other. Each of the arms 80 comprises a protruding strip 82 along the arms 80. The strips 82 are configured to slide in the corresponding grooves 68 of the cover 30 of the electrical terminal 4. The notch 76 is positioned at the level of the central portion 78 of the locking part 36.

FIG. 7b illustrates the locking device 32 in an assembled state, i.e. when the retaining circlip 34 is interlocked in the locking part 36. The retaining circlip 34 is immobilized on the locking part 36 by flat protuberances 84a, 84b, 86 which protrude from the locking part 36.

As can be seen in FIG. 7 and in FIG. 7b, the locking part 36 comprises a press surface 88 at the level of the central portion 78. The press surface 88 is provided by an "L" shaped protuberance 90 which extends from the central portion 78 in a direction opposite to the arms 80 of the locking part 36. The press surface 88 has an undulating surface so as to improve adhesion when an operator manually exerts a pressure on the press surface 88. In addition, the press surface 88 has a height L2 with a length which is adapted to a finger of an operator exerting a pressure on the press surface 88.

FIG. 7b also shows that a protuberance 92 with a triangular section protrudes from each of arms 80 of the locking part 36. The protuberances 92 protrude from a surface 94 of the locking part 36 which is intended to slide on the first surface 54 of the cover 30. The protuberances 92 act to maintain the locking device 32 with the cover 30 in a pre-assembled position, as can be seen in FIG. 8 and as will be described below.

In a variation, the function of the retaining circlip 34 is integral with that of the locking part 36 in a manner such that the locking device 32 is constituted by a single integrally formed part. The number of components of a fastening assembly of this type can therefore advantageously be reduced.

Figure 8:
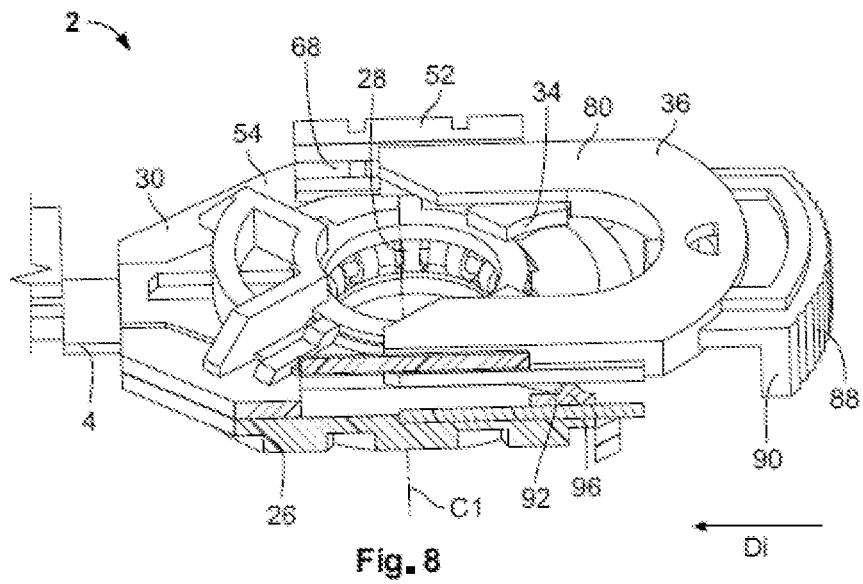
FIG. 8 is a sectional perspective view of the fastening assembly of FIG. 7 in an assembled but not locked state.

The fastening assembly 2 is shown in an assembled but not locked state in FIG. 8. The elements with the same reference numerals already used in FIGS. 7, 7a and 7b will not be described again in detail, but reference should be made to their description above.

In the assembled but not locked state, as can be seen in FIG. 8, the fastening device 6 is assembled by snap fitting in a manner such as to retain the electrical terminal 4 and the radial spring 28. In the assembled but not locked state, the radial spring 28 is loaded under the effect of the force exerted by the electrical terminal 4. The spring 28 is kept loaded in the compartment formed by snap fitting the cover 30 onto the base 26. The cover 30 is retained on the base 26 by the snap fitting retaining strips 52 of the cover 30 in the retaining orifices 48 of the base 26 (the retaining orifices 48 of the base 26 are not visible in FIG. 8—see FIG. 7a). In the assembled but not locked state, the locking device 32 has been partially slid into the grooves 68 of the cover 30 in an insertion direction Di transverse to the longitudinal central axis C1 of the electrical terminal 4. The locking device 32 is retained on the cover 30 by abutment of the protuberances 92 of the locking part 36 on the protuberances 96 with a complementary shape which protrude from the first surface 54 of the cover 30. When positioning the locking device 32, the retaining strips 82 of the locking part 36 slide behind the retaining strips 52 of the cover 30, and thus it is more difficult to dislodge them accidentally. Thus, involuntary detachment of the locking device 32, or even a loss of the locking device 32, during transport or storage of the fastening assembly 2 can be avoided.

FIGS. 9-12 represent successive steps in a method for fastening the fastening assembly 2 in accordance with the second embodiment to an electrically conducting post 98.

The elements with the same reference numerals already used in FIGS. 7, 7a, 7b and 8 will not be described again in detail, but reference should be made to their description above.

Figure 9:
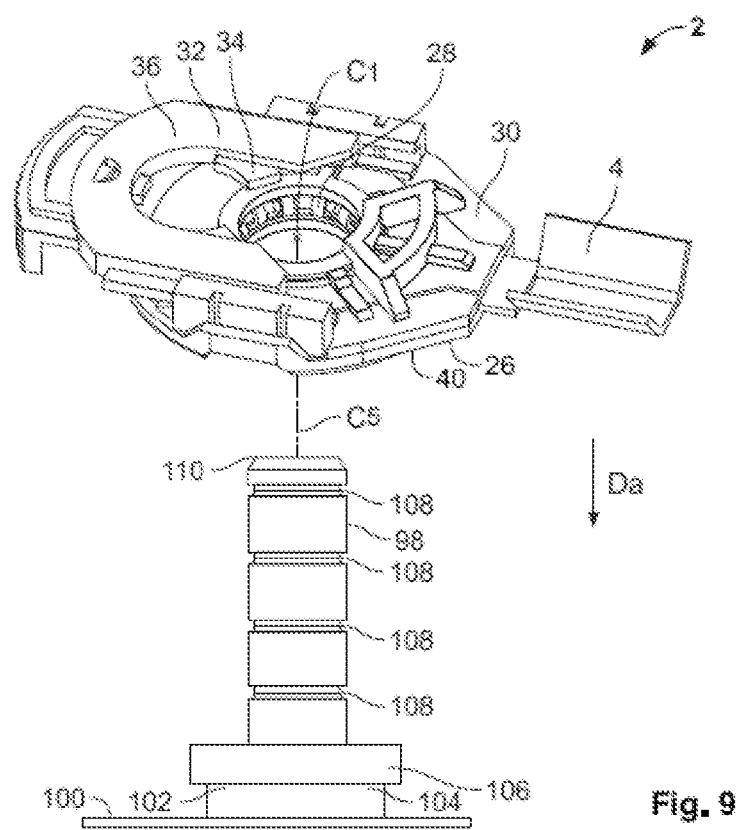
FIG. 9 is a perspective view of a first step of a method for fastening the fastening assembly of FIG. 7 to an electrically conducting post.
Figure 14:
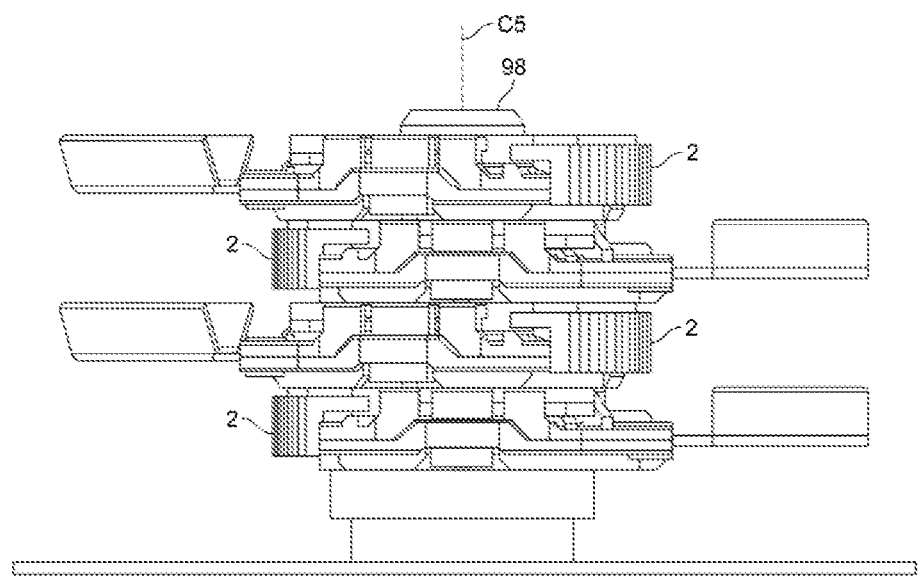
FIG. 14 is a side view of FIG. 13.

FIG. 9 represents a first step of the method for fastening the fastening assembly 2 in accordance with the second embodiment to the electrically conducting post 98. FIG. 9 illustrates a metal support 100 which may, for example, be the bodywork of a vehicle, onto which an electrically conducting post 98 is welded. The post 98 is essentially cylindrical in shape. At the level of one end 102, the post 98 comprises a head plate 104 adapted to be welded to the support 100. The head plate 104 of the post 98 comprises a collar 106. The post 98 is provided with annular grooves 108. The number of annular grooves 108 is not limited to four in the example illustrated in FIG. 9, and are positioned equidistantly with respect to each other along a longitudinal central axis C5 of the post 98. The annular grooves 108 are spaced from each other in a manner such as to enable the fastening assemblies 2 to be stacked along the longitudinal central axis C5 of the post 98, as can be seen in FIG. 14. One end 110 of the post 98, opposite to the end 102 of the post 98, is chamfered.

In the first step of the method illustrated in FIG. 9, the fastening assembly 2 is in an assembled but not locked state. The fastening assembly 2 is brought close to the post 98 in a manner such as to align the longitudinal central axis C5 of the post 98 with the longitudinal central axis C1 of the electrical terminal 4.

Figure 10:
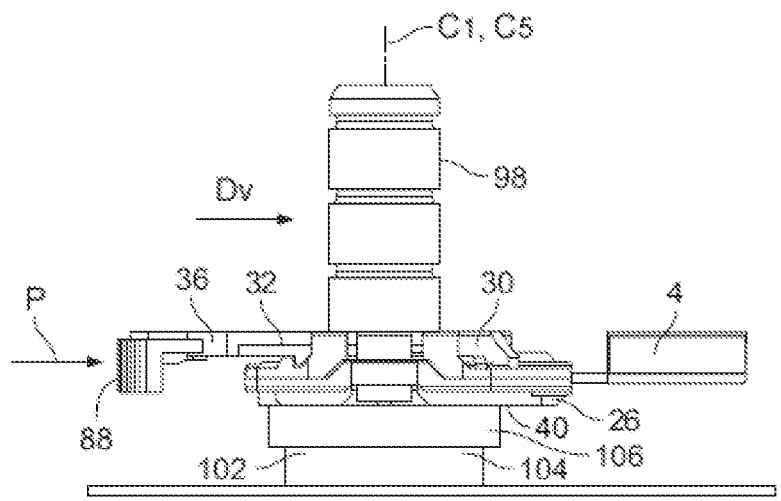
FIG. 10 is a side view of a second step of a method for fastening the fastening assembly of FIG. 7 to an electrically conducting post.

FIG. 10 represents a second step of the method for fastening the fastening assembly 2 in accordance with the second embodiment to the electrically conducting post 98. As can be seen in FIG. 10, the fastening assembly 2 has been fitted onto the post 98 in an assembly direction Da, parallel to the longitudinal central axis C5 of the post 98. The post 98 thus passes through the through hole 42 of the base 26, the through hole 12 of the electrical terminal 4 and the through hole 58 of the cover 30. As can be seen in FIG. 10, the fastening assembly 2 has not yet been locked.

In order to lock the fastening assembly 2, a pressure P is exerted on the press surface 88 of the locking part 36 of the locking device 32 in a locking direction Dv, as shown in FIG. 10. The locking direction Dv is transverse to the longitudinal central axis C1 of the electrical terminal 4 and the longitudinal central axis C5 of the post 98. The unlocking direction Dv is thus transverse to the assembly direction Da in the second embodiment of the invention.

Figure 11:
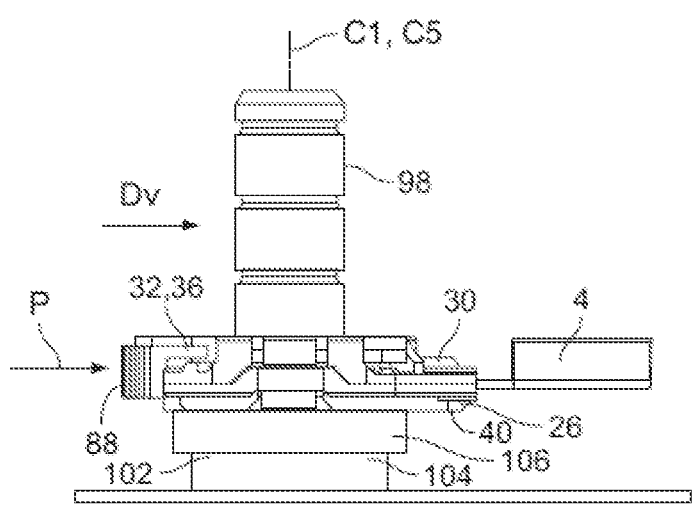
FIG. 11 is a side view of a third step of a method for fastening the fastening assembly of FIG. 7 to an electrically conducting post.
Figure 12:
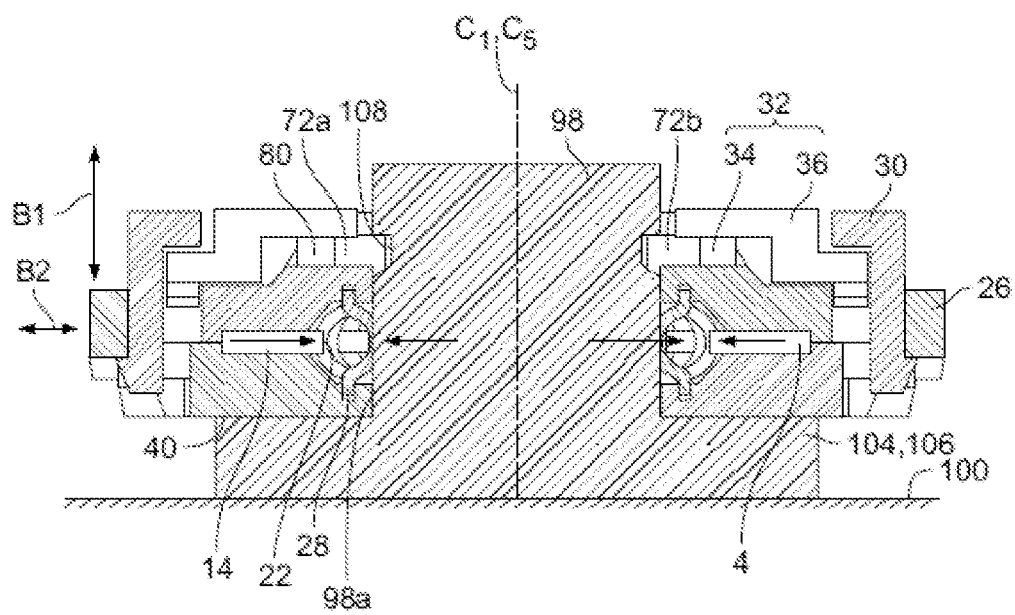
FIG. 12 is a sectional side view of FIG. 11.

FIGS. 11 and 12 represent a third step of the method for fastening the fastening assembly 2 in accordance with the second embodiment to the electrically conducting post 98. In the step shown in FIGS. 11 and 12, the fastening assembly 2 is in an assembled and locked state.

The pressure which is exerted on the press surface 88 in the locking direction Dv, indicated by the arrow P in FIG. 11, has displaced the locking device 32 by sliding the arms 80 of the locking part 36 in the grooves 68 of the cover 30 of the fastening assembly 2. The locking device 32 is slid until it reaches a locked position in which it is fixed to the cover 30 by positive locking.

As can be seen in FIG. 12, which represents a sectional view of the assembled and locked fastening assembly 2 of FIG. 11, the protuberances 72a, 72b of the retaining circlip 34 are housed in the annular groove 108 of the post 98. Thus, the fastening assembly 2 is held along an axis B1 which is parallel to the longitudinal central axis C5 of the post 98.

Figure 13:
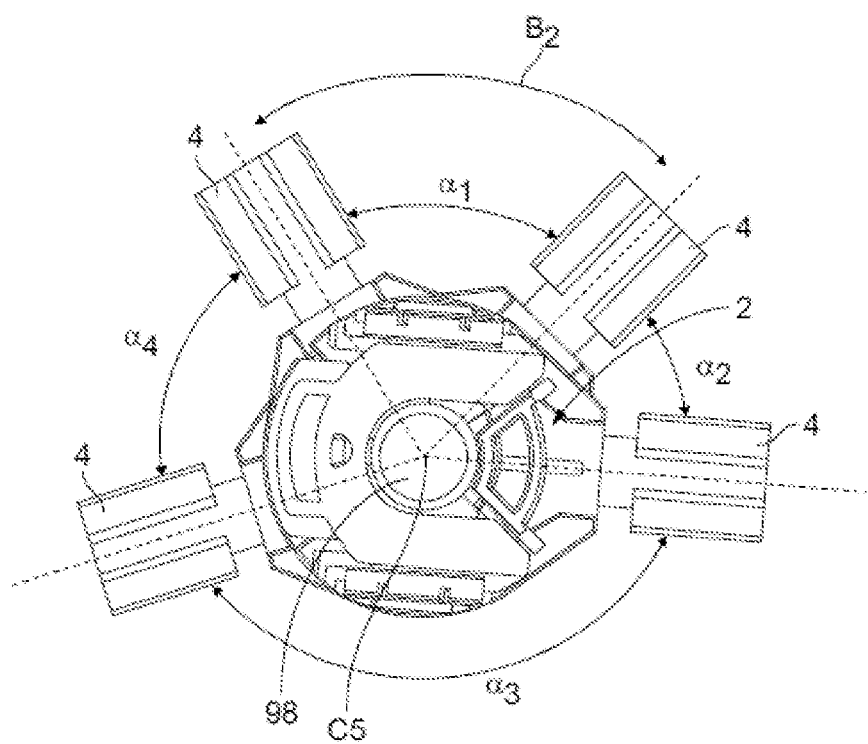
FIG. 13 is a top view of four fastening assemblies of FIG. 7 mounted on a same post.

In the second embodiment, the fastening assembly 2 can be radially displaced about the longitudinal central axis C5 of the post 98. The radial displacement of the fastening assembly 2 is indicated by the double arrow B2 in FIG. 13. Thus, the second embodiment can advantageously be used to adjust or readjust the position of the electrical terminals, and in fact after assembly and locking, without running the risk that the electrical terminals 4 would become detached from the post 98. In the second embodiment, it is thus possible to adjust the angles α1 to α4 between the electrical terminals 4 when the fastening assembly 2 is in an assembled state and locked on the post 98.

Reverting to FIG. 12, it should be noted that the second surface 40 of the base 26 which is produced from a plastic material—and thus is not electrically conducting—is in contact and bears on the collar 106 of the head 104 of the electrically conducting post 98. In the second embodiment, electrical contact between the electrical terminal 4 and the post 98 is ensured by the radial spring 28. In the assembled and locked position, the radial spring 28 is compressed between the inner lateral wall 22 of the flat ring 14 of the electrical terminal 4 and a lateral wall 98a of the post 98. The spring 28 is thus radially compressed in a direction B2 (indicated by the double arrow on FIG. 12) transverse to the longitudinal central axis C5 of the post 98 and to the longitudinal central axis C1 of the electrical terminal 4.

FIG. 14 represents a side view of four fastening assemblies 2 in accordance with the second embodiment mounted on the post 98 and stacked one on top of the other along the longitudinal central axis C5 of the post 98. Thus, the structure of the fastening assembly 2 is configured in a manner such as to be able to stack a plurality of electrical terminals on one and the same post, in particular four electrical terminals, as can be seen in FIG. 14.

The method for fastening the at least one fastening assembly 2 to an electrically conducting post 98 may be carried out in a simple manner and without tools. A step for screwing and a supplemental step for verifying the tightening torque of a nut on the post are thus not necessary. In addition, the locked position may be activated and reached manually by means of the press surface 88 with a single continuous movement by an operator. Such a fastening method can thus enable simple, easy and rapid locking. Furthermore, the fastening assembly 2 can be used to adjust the position of the electrical terminals, even in an assembled and locked state, by allowing radial displacement B2 of the electrical terminal or terminals about the longitudinal central axis C5 of the post 98.

Figure 15A:
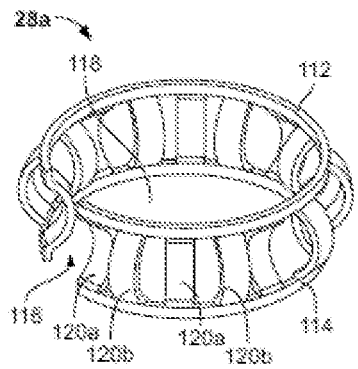
FIG. 15a is a perspective view of a radial spring according to an embodiment.
Figure 15B:
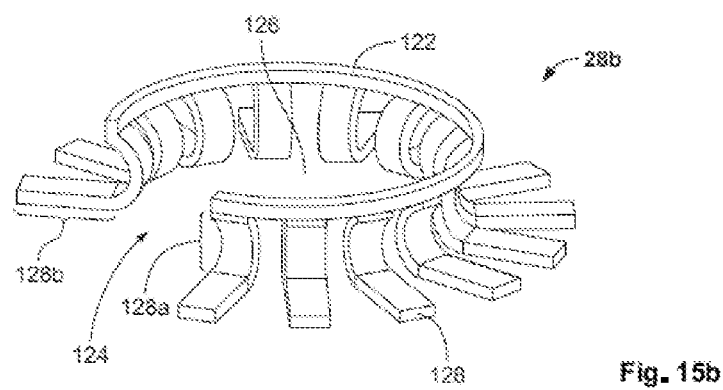
FIG. 15b is a perspective view of a radial spring according to another embodiment.
Figure 15C:
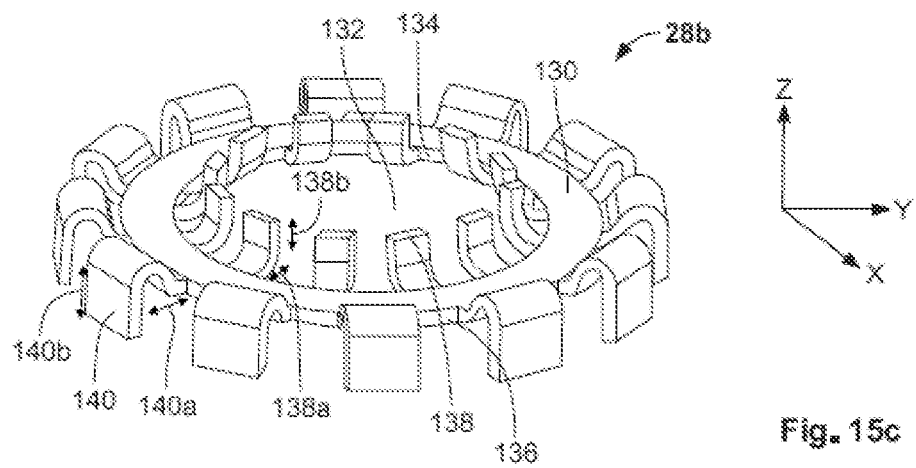
FIG. 15c is a perspective view of a radial spring according to another embodiment.

FIGS. 15a, 15b and 15c represent exemplary embodiments of radial springs 28a, 28b, 28c for the fastening assembly 2.

FIG. 15a illustrates a radial spring 28a which is substantially circular and partially open. The radial spring 28a corresponds to the spring 28 illustrated in FIGS. 7, 7a, 8, 9 and 12. The radial spring 28a comprises two open hoops 112, 114 in a manner such as to define an opening 116 and a through hole 118. The two hoops 112, 114 are connected together by half turns 120a, 120b. The turns 120a, 120b are positioned such that the turns 120a, 120b are orientated in succession and one, 120a, is opposite to the other, 120b, along the hoops 112, 114. A first set of turns 120a comprises turns 120a positioned and orientated in a manner such as to be in contact with a post when a fastening assembly in accordance with the second embodiment comprising the radial spring 28a is assembled and locked on the post. A second set of turns 120b comprises turns which are positioned and orientated in a manner such as to be in contact with an inner lateral wall of an electrical terminal when the radial spring 28a is assembled on a fastening assembly in accordance with the second embodiment of the invention.

FIG. 12, described above, illustrates a sectional view which demonstrates that a first set of turns of the spring 28 is in contact with the lateral wall 98a of the post 98, while a second set of turns is in contact with the inner lateral wall 22 of the electrical terminal 4.

FIG. 15b illustrates a variation of a radial spring for the fastening assembly 2. The spring 28b shown in FIG. 15b is a semi-radial spring. The semi-radial spring 28b comprises un single open hoop 122 defining an opening 124 and a through hole 126. A plurality of strips 128 protrude from the hoop 122. A first curved portion 128a of each strip 128 is positioned and orientated in a manner such as to be in contact with a post when a fastening assembly in accordance with the second embodiment comprising the semi-radial spring 28b is assembled and locked on the post. A second flat portion 128b of each strip 128 is configured to be in contact with a flat surface of an electrical terminal 4, like the second flat surface 18 of the electrical terminal 4 illustrated in FIG. 7. The configuration of the semi-radial spring 28b provides for more flexibility.

FIG. 15c shows another variation of a radial spring for the fastening assembly 2. The spring 28c shown in FIG. 15c comprises a flat ring 130 which defines a through hole 132. The flat ring 130 is delimited by an inner lateral wall 134 at the level of the through hole 132 and by an outer lateral wall 136. A first set of strips 138 protrudes from the inner lateral wall 134 of the spring 28c. A second set of strips 140 protrudes from the outer lateral wall 136 of the spring 28c. The strips of the first set 138 and the strips of the second set 140 protrude in directions which are opposed to each other (along the Z axis Z in the Cartesian coordinates indicated in FIG. 15c) in a manner essentially transverse to the plane (XY) of the flat ring 130. The strip 138, 140 each comprises a first curved portion 138a, 140a and a second flat portion 138b, 140b which extends along the Z axis. The second flat portion 138b of each strip of the first set of strips 138 is positioned and orientated in a manner such as to be in contact with a post when a fastening assembly in accordance with the second embodiment comprising the spring 28c is assembled and locked on the post. The second flat portion 140b of each strip of the first set of strips 140 is positioned and orientated so as to be in contact with an inner lateral wall of an electrical terminal when the spring 28c is assembled on a fastening assembly in accordance with the second embodiment of the invention.

Figure 16A:
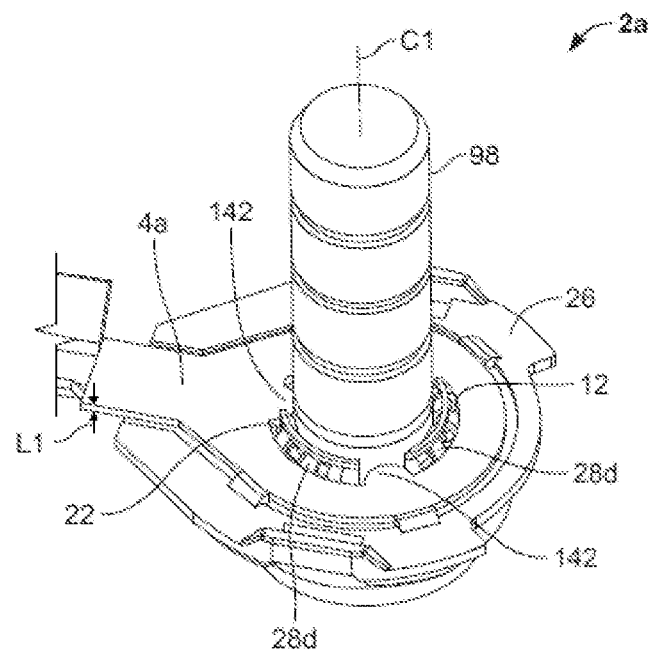
FIG. 16a is a perspective view of an electrical terminal for a fastening assembly according to an embodiment.
Figure 16B:
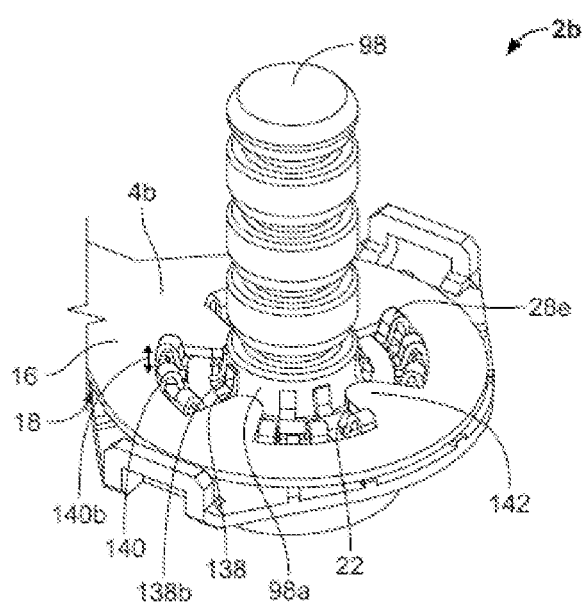
FIG. 16b is a perspective view of an electrical terminal for a fastening assembly according to another embodiment.

FIGS. 16a and 16b represent variations of the electrical terminal for a fastening assembly in accordance with the second embodiment of the invention. The elements with the same reference numerals already used in FIGS. 7-14 will not be described again in detail, but reference should be made to their description above.

FIG. 16a represents an electrical terminal 4a which differs from the electrical terminal 4 described above in respect of FIG. 7 in that flat protuberances 142 protrude from the inner lateral wall 22 of the electrical terminal towards the centre of the through hole 12 through which the longitudinal central axis C1 passes. The flat protuberances 142 have a thickness L1 and a semi-circular shape.

FIG. 16a in addition illustrates a partial view of a fastening assembly 2a in accordance with a variation of the second embodiment of the invention comprising the electrical terminal 4a and a plurality of radial springs 28d. Because the electrical terminal 4a is provided with three flat protuberances 142, the fastening assembly 2a comprises three radial springs 28d which are disposed between each protuberance 142 of the electrical terminal 4a. The radial springs 28d correspond to cut-out sections of a radial spring like the radial spring 28, 28a described above.

FIG. 16b represents an electrical terminal 4b which is substantially similar to that described in FIG. 16a, but wherein the protuberances 142 have a rather more oval shape in the plane of the first surface 16 and of the second surface 18 of the electrical terminal. FIG. 16b illustrates a partial view of a fastening assembly 2b in accordance with a variation of the second embodiment of the invention comprising the electrical terminal 4b and a plurality of radial springs 28e. Because the electrical terminal 4b is provided with four flat protuberances 142, the fastening assembly 2b comprises four radial springs 28e which are disposed between each protuberance 142 of the electrical terminal 4b. The radial springs 28e correspond to cut-out sections of a radial spring like the spring 28e described above.

Moreover, FIG. 16b can be used to show that the electrical contact between a post 98 and the electrical terminal 4b is ensured on the one hand by contact between the second flat portion 138b of the strips of the first set of strips 138 with a lateral wall 98a of the post 98; and on the other hand by contact between the second flat portion 140b of the strips of the second set of strips 140 with the inner lateral wall 22 of the electrical terminal 4b.

The flat protuberances 142 of the electrical terminals 4a, 4b illustrated in FIGS. 16a and 16b can be used to ensure better positioning of the electrical terminals 4a, 4b when they are assembled on a post. Furthermore, the flat protuberances 142 can be used to ensure better control of the deformation of the radial springs 28d, 28e and to avoid the disadvantages linked to stress relaxation over time. The number of flat protuberances 142 per electrical terminal as well as their geometric shape is not limited to the examples of FIGS. 16a and 16b.

The present invention also pertains to a fastening assembly 2 and to a post 98 comprising at least one annular groove 108 adapted to receive the retaining circlip 34 of the fastening assembly 2 in the locked position.

Figure 17:
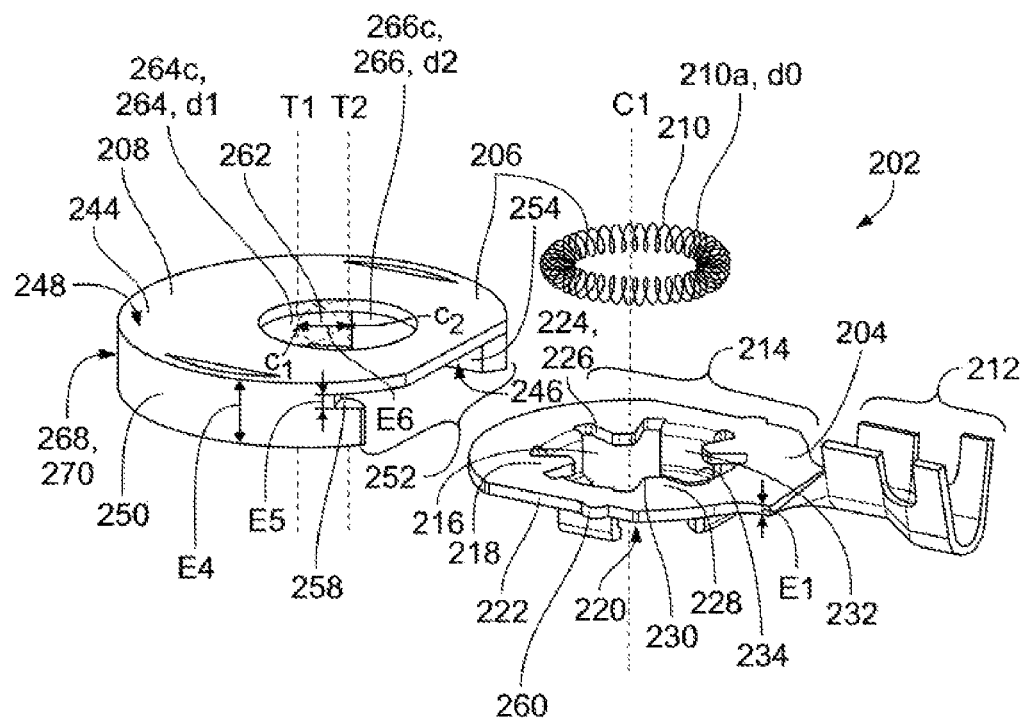
FIG. 17 is an exploded perspective view of a fastening assembly according to another embodiment.

FIG. 17 is an exploded view of a fastening assembly 202 in accordance with a third embodiment of the invention. The fastening assembly 202 comprises an electrical terminal 204 and a fastening device 206. The fastening device 206 in accordance with the third embodiment is constituted by a locking device 208 and a spring 210. The spring 210 is a helical spring which is circular in shape and closed, in other words, annular. The spring 210 thus comprises a plurality of turns 210a.

In a variation which is not shown, the fastening device 206 in accordance with the third embodiment may be constituted by a locking device 208 and a plurality of springs, for example the plurality of springs 28a-e in the fastening assembly 2b illustrated in FIG. 16b.

The electrical terminal 204 in accordance with the third embodiment will now be described, then the fastening device 206.

The electrical terminal 204, as shown in FIG. 17, is an electrical terminal of the ring terminal type and comprises a first portion 212 to which an electrical cable is intended to be connected and a second portion 214 provided with a through hole 216 adapted to be passed through by an electrical is intended to be connected. The second portion 214 of the electrical terminal 204 has a first flat surface 218 and a second flat surface 220, opposite to the first flat surface 218 along a longitudinal central axis C1 of the through hole 216. FIG. 17 also illustrates an outer lateral wall 222 and an inner lateral wall 224 of the electrical terminal 204. The inner lateral wall 224 corresponds to an inner lateral wall 226 of the through hole 216 of the electrical terminal 204. The dimensions of the electrical terminal 204, in particular the thickness E1 between the first flat surface 218 and the second flat surface 220, are adapted to the dimensions of the fastening device 206 in accordance with the third embodiment of the invention.

Like the electrical terminals 4a, 4b in the variations of the second embodiment, the electrical terminal 204 in accordance with the third embodiment also comprises flat protuberances 228 which protrude from the inner lateral wall 224 of the electrical terminal 204 towards the longitudinal central axis C1 of the through hole 216, as shown in FIG. 17. The flat protuberances 228 have a thickness E1 and the free ends 230 of the flat protuberances 228 are substantially oval in shape.

The structure of the second portion 214 in accordance with the third embodiment differs from that of the second portions 107 and 10 of the electrical terminals 103a-d and 4, 4a, 4b in the first and the second embodiments in that it further comprises protuberances 232 disposed so that each provides a bearing surface 234 for the spring 210. The protuberances 232 and the flat protuberances 228 are disposed in an alternating manner one with respect to the other about the longitudinal central axis C1. The electrical terminal 204 illustrated in FIG. 17 comprises four protuberances 232. However, the number of protuberances 232 is not limiting and may be less than or greater than four in accordance with variations of the third embodiment. Because the four protuberances 232 illustrated in FIG. 17 are identical, the singular is used below to describe the protuberances 232.

Figure 17A:
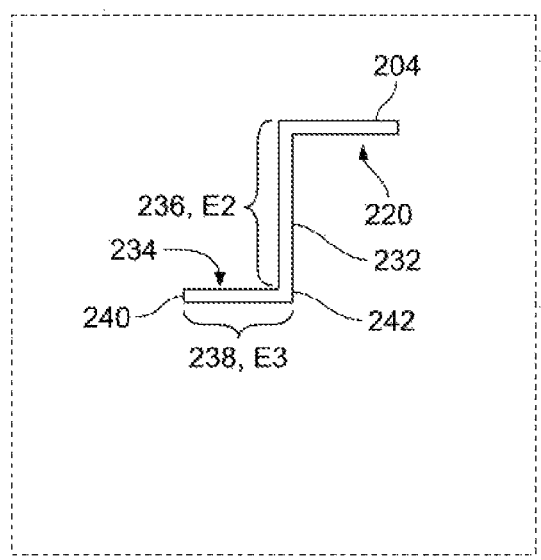
FIG. 17a is a partial sectional view of an electrical terminal of the fastening assembly of FIG. 17.

Reference will now be made to FIG. 17 in combination with FIG. 17a, which diagrammatically represents a sectional view of a protuberance 232. The protuberance 232 comprises a first portion 236 which extends transversely over a length E2 from the second flat surface 220, i.e. in a direction parallel to the longitudinal central axis C1. A second portion 238 of the protuberance 232 extends from the first portion 236 over a length E3 in a plane parallel to the second flat surface 220 and towards the longitudinal central axis C1. Thus, the first portion 236 and the second portion 238 of the protuberance 232 substantially form a right angle between them. It is the second portion 238 which provides the bearing surface 234 for the spring 210. Said bearing surface 214 comprises a free end 240 opposite to an end 242 bordered by the first portion 236.

By providing a bearing surface 234, the protuberance 232 offers a receiving and support surface for the spring 210. Thus, the spring 210 may be positioned in the electrical terminal 204 by resting on each bearing surface 234. For this reason, the feature of the electrical terminal 204 of the third embodiment which distinguishes it from those of the preceding embodiments is that the spring 210 may be pre-assembled on the electrical terminal 204 without the need for the locking device 208 of the fastening device 206 in order to maintain the spring 210 on the electrical terminal 204. The locking device 208 serves to fasten the electrical terminal 204 to an electrically conducting post (not shown in FIG. 17, but see FIG. 20 described below).

In the third embodiment, the locking device 208 is integrally formed in one piece. The fastening device 206 is produced from a plastic material, in particular by injection moulding. Thus, no assembly step is necessary in order to assemble the locking device 208 and the number of pieces of the fastening device 206 may advantageously be reduced.

The locking device 208 comprises a flat base 244, as shown in FIG. 17. The flat base 244 comprises a first surface 246 configured to be in contact with the electrical terminal 204 in an assembled state of the fastening assembly 202 and a second surface 248 opposite to the first surface 246. The flat base 244 has a shape which is substantially complementary to the second portion 214 of the electrical terminal 204. The flat base 244 is partially bordered by a lateral wall 250 which extends transversely over a length E4 from the first surface 246. The length E4 is substantially equal to the length E2; this is clearly shown in FIG. 17a which will be described below. A portion 252 of the flat base 244 is not bordered by the lateral wall 250 in order to allow insertion, in particular translation, of the second portion 214 of the electrical terminal 204 in the locking device 208.

The inner face 254 of the lateral wall 250, as shown in FIG. 17, is provided with a longitudinal groove 258 with thickness E5. The longitudinal groove 258 is adapted so that the second portion 214 of the electrical terminal 204 can be inserted by translation. Thus, the thickness E5 is dimensioned in a manner such that the groove 258 can receive the electrical terminal 204 with thickness E1. Although not visible in FIG. 17, the groove 258 comprises two projections disposed in a manner such that protuberances 260 which extend from the lateral wall 222 of the electrical terminal 204 are immobilized against said projections in a locked position of the fastening assembly 202, described further with reference to FIGS. 19a, 19b.

The locking device 208 further comprises a through orifice 262, as shown in FIG. 17. In the plane of the flat base 244, the through orifice 262 has a shape obtained by partially overlapping two circles 264c, 266c (shown in dashed lines in FIG. 17) with centres c1, c2 and with different diameters d1, d2. Given that the through orifice 262 passes through the flat base 244 of the first surface 246 to the second surface 248 of the locking device 208, the through orifice 262 has a depth equivalent to the distance between the first surface 246 and the second 248 of the locking device 208. Each of the circles 264c, 266c extends to the depth of the through orifice 262 mentioned above. Thus, reference will be made below to circular "holes" 264, 266 which overlap. The longitudinal central axes T1, T2 used below respectively correspond to the longitudinal central axes of the circular holes 264, 266 and which respectively pass through the centres c1, c2 of the circles 264c, 266c.

The circular holes 264, 266 respectively have diameters d1, d2, as shown in FIG. 17. The diameter d1 of the first circular hole 264 is smaller than the diameter d2 of the second circular hole 266. The diameter d1 of the first circular hole 264 is designed so as to be substantially equal to the diameter of a groove of a post on which the fastening assembly 202 is intended to be fixed.

The circular holes 264, 266 overlap as shown in FIG. 17, i.e. they are partially superimposed. The longitudinal central axis T1 of the first circular hole 264 is thus not aligned with the longitudinal central axis T2 of the second circular hole 266. In other words, the centres c1, c2 of circles 264c, 266c do not coincide. The longitudinal central axes T1, T2 of the circular holes 264, 266 are orientated transversely to the flat base 244. In the plane of the flat base 244, the longitudinal central axes T1, T2 of the circular holes 264, 266 are spaced from each other by a distance E6. In other words, the centres c1, c2 of the circles 264c, 266c are spaced from each other by a distance E6. In the plane of the flat base 244, the axis T2 of the second circular hole 266 is positioned closer to the free portion 252 of the flat base 244 than the axis T1 of the first circular hole 264.

An outer portion 268 of the lateral wall 250, opposite to the free portion 252, of the locking device 208 provides a press surface 270 as shown in FIG. 17. The press surface 270 has an undulating surface in a manner such as to improve adhesion when an operator manually exerts a pressure on the press surface 270.

FIGS. 18a, 18b and 19a, 19d represent successive steps for assembling the fastening assembly 202 in accordance with the third embodiment. The elements with the same reference numerals already used in FIGS. 17, 17a will not be described again in detail, but reference should be made to their description above.

Figure 18A:
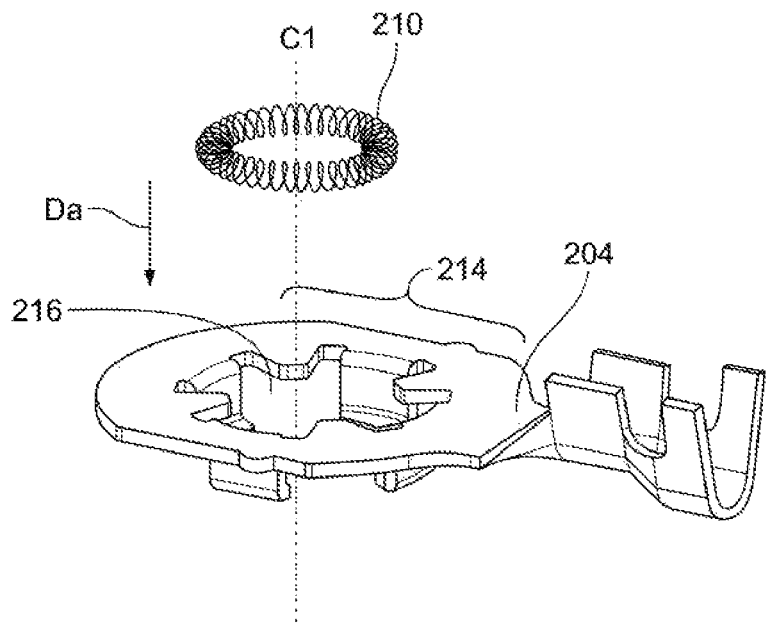
FIG. 18a is a perspective view of a first step of assembling the fastening assembly of FIG. 17.
Figure 18B:
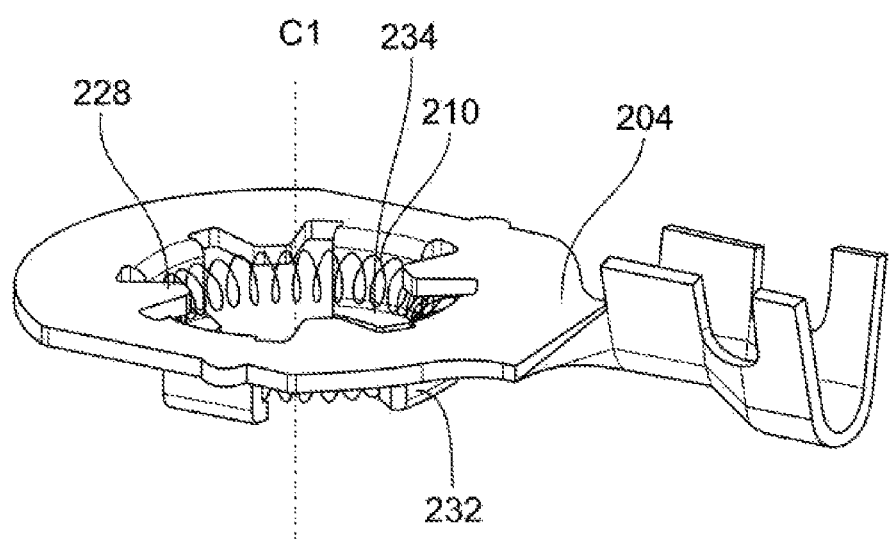

FIGS. 18a, 18b represent a first step for the fastening assembly 202. During this first step, the spring 210 is assembled with the electrical terminal 204 in accordance with an assembly direction Da parallel to the longitudinal central axis C1 of the electrical terminal 204.

The spring 210 is thus disposed at the level of the second portion 214 of the electrical terminal 204.

As can be seen in FIG. 18b, the spring 210 rests on the bearing surfaces 234 of the protuberance 232. The flat protuberances 228 of the electrical terminal 204 can be used to further maintain the spring 210 in the position illustrated in FIG. 18b. Thus, the risk of involuntary disassembly of the electrical terminal 204 and of the spring 210, or even a loss of the spring 210, may be reduced, even before the locking device 208 has been assembled. The at least one flat protuberance 228 can be used to produce better positioning of the electrical terminal 204 when it is assembled on a post. Furthermore, the at least one protuberance 228 can also be used to provide better control of the deformation of the spring 210 and avoid the disadvantages associated with stress relaxation. Depending on the dimensions of the through hole 216 and the protuberances 232 of the electrical terminal 204 with respect to that of the annular diameter d3 of the spring 210, the spring 210 may be partially loaded in the position illustrated in the FIG. 18b. In all cases, the spring 210 is provided so as to be deformed and therefore loaded in the locked assembled state of the fastening assembly 202 illustrated in the FIG. 22c and described below.

Figure 19A:
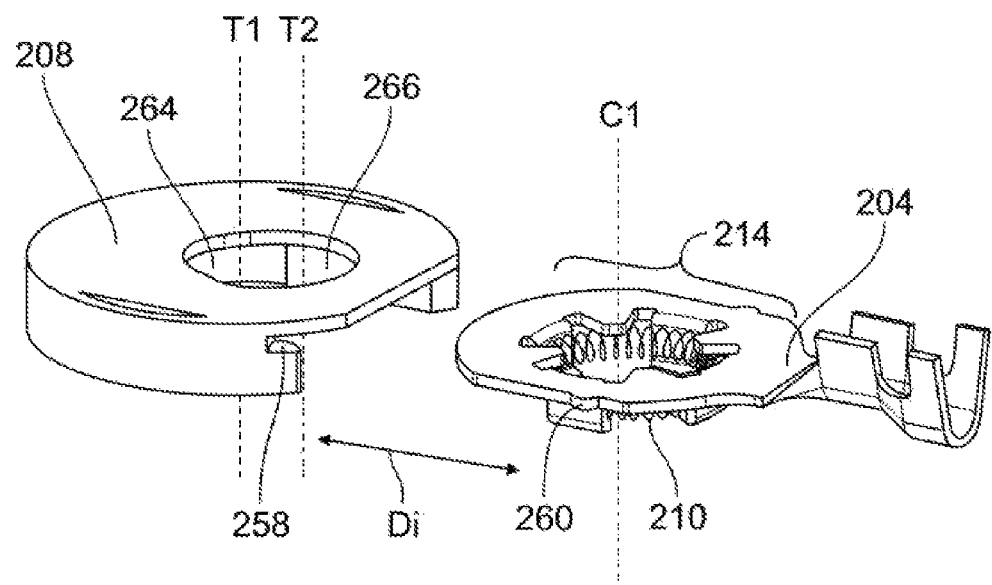
FIG. 19a is a perspective view of a second step of assembling the fastening assembly of FIG. 17.
Figure 19B:
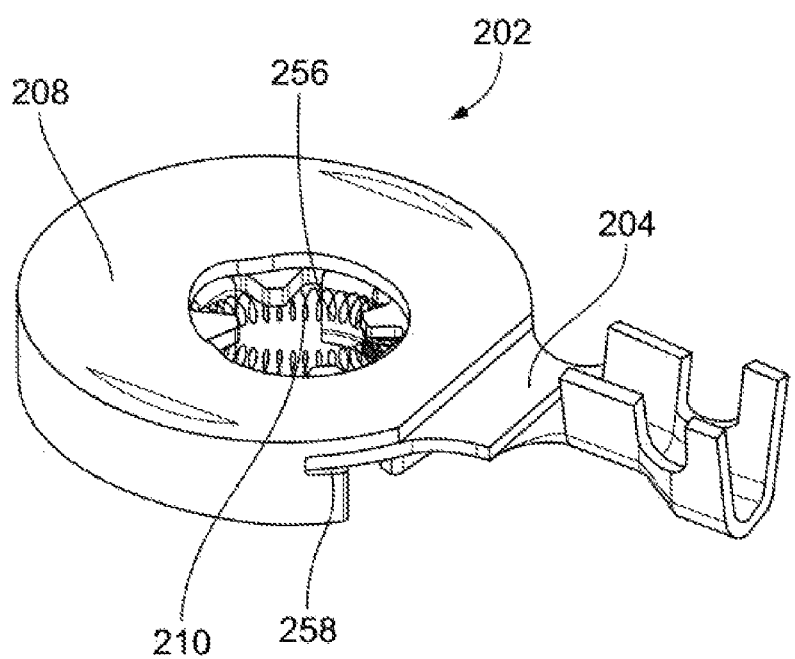

FIGS. 19a, 19b represent a second step for the fastening assembly 202. During this second step, the electrical terminal 204 slides in the longitudinal groove 258 of the locking device 208 in an insertion direction Di. The insertion direction Di is transverse to the longitudinal central axis C1 of the electrical terminal 204 and to the longitudinal central axes T1, T2 of the circular holes 264, 266.

The fastening assembly 202 of FIG. 19b is in an assembled state which is not locked, i.e. the fastening assembly 202 is assembled but has not yet either been mounted or locked on a post. In the assembled but not locked state shown in FIG. 19b, the electrical terminal 204 is maintained on the locking device 208 by immobilizing the protuberances 260 against the protrusions of the longitudinal groove 258 (not visible in FIG. 19b). In other words, the locking device 208 is snap fitted onto the electrical terminal 204. The spring 210 is thus maintained in a compartment 256 formed by assembling the electrical terminal 204 and the locking device 208.

In the third embodiment, because the locking device 208 of the fastening device 206 is integrally formed in a single piece, assembly of the fastening assembly 202 is simplified.

Figure 20:
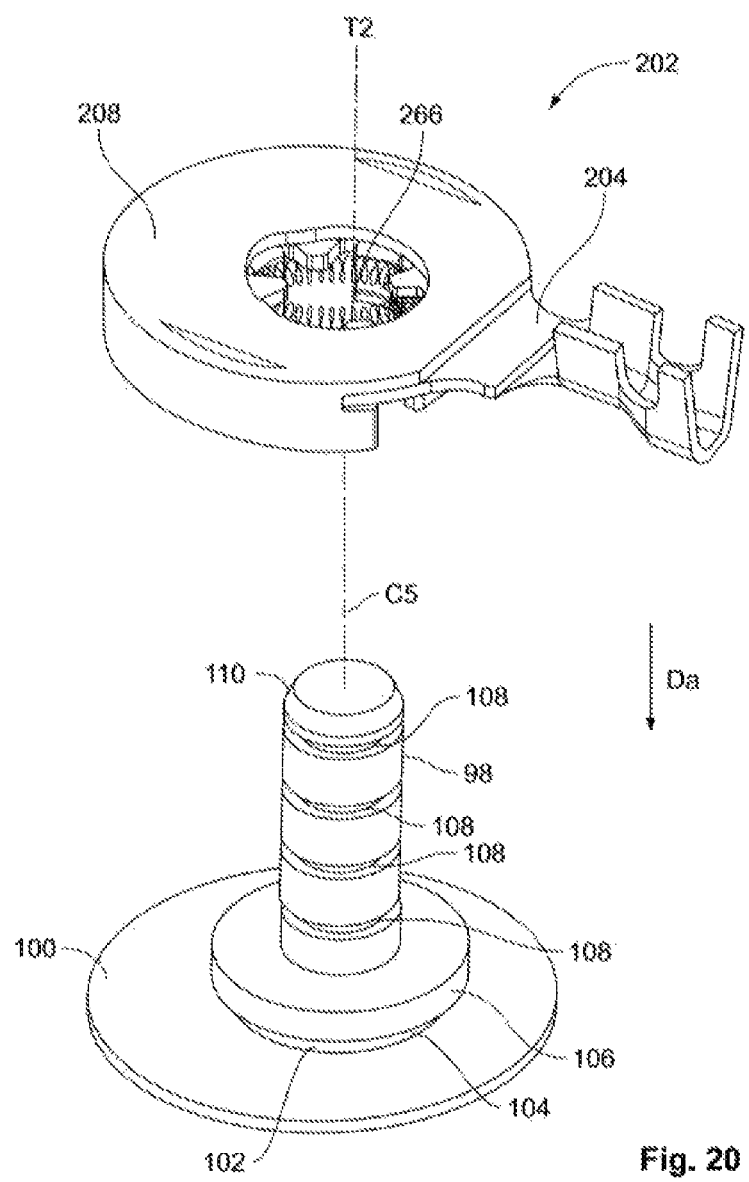
FIG. 20 is an exploded perspective view of a first step of a method for fastening the fastening assembly of FIG. 17 to an electrically conducting post.

FIG. 20 represents a first step of the method for fastening the fastening assembly 202 in accordance with the third embodiment to an electrically conducting post 98. The post 98 has already been described with reference to FIG. 9, the second embodiment.

FIG. 20 illustrates a metal support 100 which may, for example, be the bodywork of a vehicle, to which an electrically conducting post 98 is welded. The post 98 is essentially cylindrical in shape. The post 98 comprises a head plate 104 at the level of one end 102 which is adapted to be welded to the support 100. The head plate 104 of the post 98 comprises a collar 106. The post 98 is provided with annular grooves 108. In the example illustrated in FIG. 20, the number of annular grooves 108 is not limited to four and are positioned equidistantly with respect to each other along a longitudinal central axis C5 of the post 98. The annular grooves 108 are spaced from each other in a manner such as to allow the fixing assemblies 202 to be stacked along the longitudinal central axis C5 of the post 98. One end 110 of the post 98, opposite to the end 102 of the post 98, is chamfered.

In the first step of the method illustrated in FIG. 20, the fastening assembly 202 is in an assembled state and not locked. The fastening assembly 202 is brought close to the post 98 in a manner such as to align the longitudinal central axis C5 of the post 98 with the longitudinal central axis T2 of the second hole 266 of the locking device 208. The locking device 208 is provided so as to be fitted on the post 98 in an assembly direction Da, parallel to the longitudinal central axis C5 of the post 98.

Figure 21A:
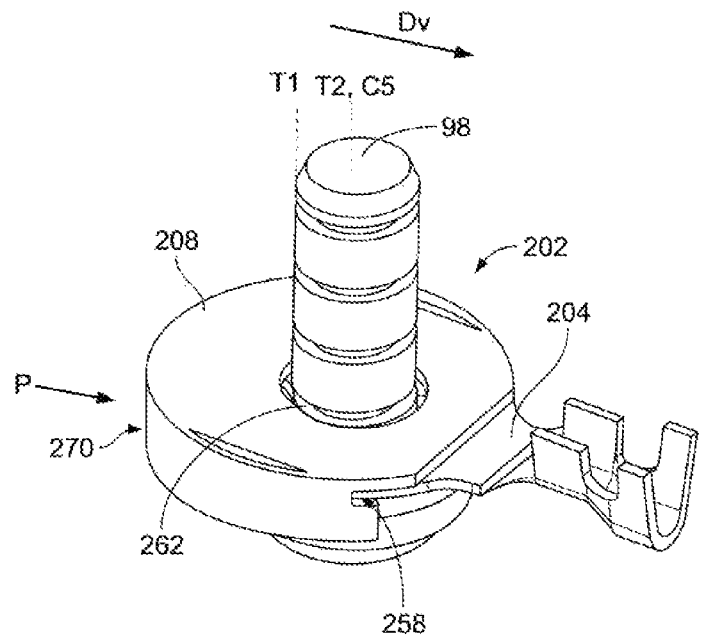
FIG. 21a is a perspective view of a second step of a method for fastening the fastening assembly of FIG. 17 to an electrically conducting post.
Figure 21B:
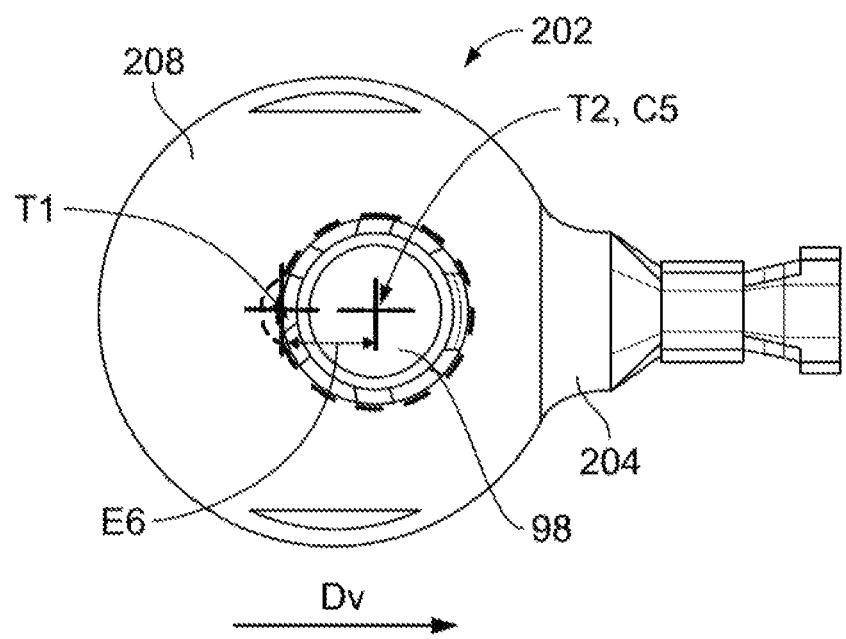

FIGS. 21a, 21b represent a second step of the method for fastening the fastening assembly 202 in accordance with the third embodiment on the electrically conducting post 98. As can be seen in FIG. 21a, the fastening assembly 202 has been fitted onto the post 98 in the assembly direction Da, parallel to the longitudinal central axis C5 of the post 98. The post 98 thus passes through the through orifice 262 of the locking device 208. In this second step of the method, the longitudinal central axis C5 of the post 98 is aligned with, i.e. coincident with, the longitudinal central axis T2 of the second hole 266 of the locking device 208

The fastening assembly 202 shown in FIGS. 21a, 21b has not yet been locked. In order to lock the fastening assembly 202, a pressure P is exerted on the press surface 270 of the locking device 208 in a locking direction Dv. The locking direction Dv is transverse to the longitudinal central axis C1 of the electrical terminal 4 and the longitudinal central axis C5 of the post 98. In the third embodiment of the invention, as in the second mode, the unlocking direction Dv is thus transverse to the assembly direction Da, shown in FIG. 20.

Figure 22A:
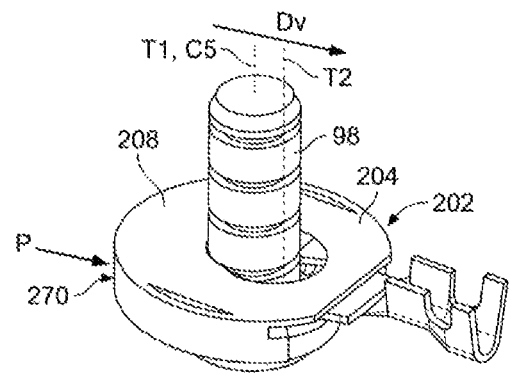
FIG. 22a is a perspective view of a third step of a method for fastening the fastening assembly of FIG. 17 to an electrically conducting post.
Figure 22B:
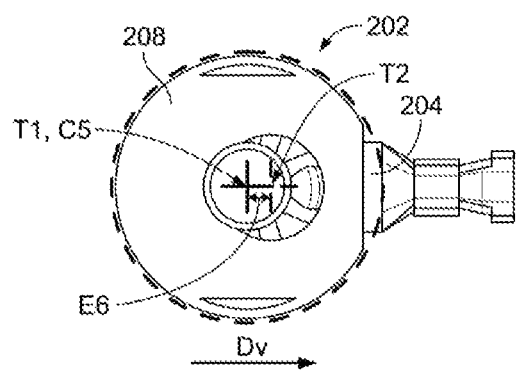

FIGS. 22a and 22b represent a third step of the method for fastening the fastening assembly 202 in accordance with the third embodiment on the electrically conducting post 98. In the step shown in FIGS. 22a and 22b, the fastening assembly 202 is in an assembled state and locked. The pressure, indicated by the arrow P, exerted in the locking direction Dv on the press surface 270 has displaced the fastening assembly 202 over a distance equal to E6.

The fastening assembly 202 is thus slid until it reaches a locked position in which the longitudinal central axis C5 of the post 98 is aligned with, i.e. coincident with, the longitudinal central axis T1 of the first hole 264 of the locking device 208.

Figure 22C:
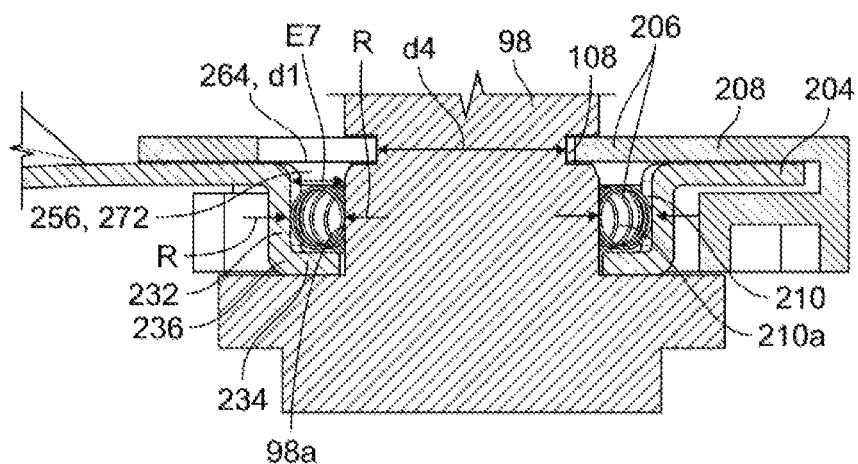

FIG. 22c illustrates a cross sectional view of the assembly of FIG. 22a and illustrates further structural details of the assembled and locked state. As can be seen in FIG. 22c, at the level of the first hole 264, the locking device 208 is housed in an annular groove 108 of the post 98. This is made possible because the diameter d1 of the first hole 264 is dimensioned in a manner such as to be substantially equal to the diameter d4 of the post 98 at the level of the groove 108. Thus, maintenance of the fastening assembly 202 on the post 98 is ensured.

FIG. 22c demonstrates that from the second step of the method for fastening the fastening assembly 202 in accordance with the third embodiment on the electrically conducting post 98, i.e. when the fastening assembly 202 is fitted onto the post 98 in the assembly direction Da, the spring 210 is radially deformed and thus loaded under the effect of the force exerted by the post 98.

In fact, as illustrated in FIG. 22c, the spring 210 is housed in a compartment 272 formed by the post 98, the electrical terminal 204 and the locking device 208. The width E7 between the post 98 and the electrical terminal 204 is adapted so as to be substantially shorter than the diameter d0 of a turn 210a of the spring 210 unstressed. This difference in dimensions between the turns 210a of the spring 210 and the width E7 of the compartment 271 causes radial deformation of the spring 210, indicated by the arrows R in FIG. 22c.

In the assembled and locked position, the spring 210 is thus compressed between the first portion 236 of the protuberance 232 of the electrical terminal 204 and a lateral wall 98a of the post 98. The radial deformation R of the spring 210 can be used to produce the electrical contact between the electrical terminal 204 and the post 98. In the third embodiment, the electrical contact between the electrical terminal 204 and the post 98 is thus ensured by the spring 210.

FIG. 22c also shows the bearing surface 234 provided by the protuberance 232 of the electrical terminal 204 and already described above. In a variation which is not shown, several fastening assemblies 204 in accordance with the third embodiment could be mounted on the post 98 and stacked one on top of the other along the longitudinal central axis C5 of the post 98.

The method for fastening the fastening assembly 204 in accordance with the third embodiment to an electrically conducting post 98 may be carried out in a simple manner and without tools. A step for screwing and a supplemental step for verifying the tightening torque of a nut on the post are thus not necessary. In addition, the locked position may be activated and reached manually by means of the press surface 270 with a single continuous movement by an operator. Such a fastening method can thus enable simple, easy and rapid locking.

The embodiments described are simply possible configurations and it should be borne in mind that the individual characteristics of the various embodiments may be combined together or provided independently of each other.

What is claimed is:

1. A fastening device for fastening an electrical terminal to an electrically conducting post, comprising:
a spring; and
a locking device retaining the electrical terminal on the electrically conducting post in a locked position of the fastening device, the spring is at least partially loaded in the locked position, the locking device includes a retaining circlip that is resiliently deformable and inserted into the locking device by sliding in an insertion direction transverse to a locking direction.

2. The fastening device of claim 1, wherein the spring is housed in a compartment assembled by snap fitting.

3. The fastening device of claim 1, further comprising a press surface, the locked position is reached by exerting a pressure on the press surface in the locking direction.

4. The fastening device of claim 3, further comprising a hollow shank extending to either side of the fastening device from the press surface toward a surface opposite the press surface in the locking direction, the hollow shank is dimensioned to house the electrically conducting post.

5. The fastening device of claim 4, further comprising a pair of compression springs, a first spring of the compression springs has a diameter larger than a second spring of the compression springs.

6. The fastening device of claim 5, wherein, in the locked position, a direction of a restoring force exerted by the first spring and a direction of a restoring force exerted by the second spring are parallel with respect to each other and to a longitudinal central axis of the hollow shank.

7. The fastening device of claim 4, wherein the hollow shank has at least one opening on a lateral wall provided to receive a portion of the locking device.

8. The fastening device of claim 1, wherein the spring and the locking device are integrally formed in a single piece.

9. The fastening device of claim 8, wherein the locking device includes a through orifice adapted for a post to pass through, the through orifice has a shape obtained by partially overlapping a pair of circles of different diameters.

10. A fastening assembly, comprising:
an electrical terminal having a first portion to which an electrical cable is configured to be connected and a second portion having a through hole receiving an electrically conducting post; and
a fastening device including a spring and a locking device retaining the electrical terminal on the electrically conducting post in a locked position of the fastening device, the spring is at least partially loaded in the locked position, the spring is in at least partial contact with an inner wall of the through hole of the electrical terminal, a press surface of the fastening device is disposed such that the locked position is reached by exerting a pressure on the press surface in a locking direction, the locking direction being transverse to a central axis of the through hole of the electrical terminal.

11. The fastening assembly of claim 10, wherein the electrical terminal has a protuberance providing a bearing surface for the spring.

12. The fastening assembly of claim 11, wherein the electrical terminal has a flat projection partially extending from the second portion toward a center of the through hole of the electrical terminal and in a plane parallel to the bearing surface.

13. The fastening assembly of claim 10, wherein the locking device has a groove and a portion of the electrical terminal is adapted to slide in the groove.

14. The fastening assembly of claim 13, wherein the locking device and the electrical terminal are attached to each other by positive locking.

15. The fastening assembly of claim 10, wherein the spring is a radial spring and, in the locked position, a direction of a restoring force exerted by the spring is transverse to a longitudinal central axis of the through hole of the electrical terminal.

16. The fastening assembly of claim 10, wherein the electrical terminal has a flat projection partially extending from the second portion toward a center of the through hole of the electrical terminal.

17. A method of fastening an electrical terminal to an electrically conducting post, comprising:
providing the electrically conductive post having a head capable of being welded to a support;
providing a fastening device including a spring and a locking device;

fitting the electrical terminal and the fastening device on the post with the post extending through the electrical terminal and the fastening device, the electrical terminal is positioned between the head of the post and the fastening device; and exerting a pressure in a locking direction on a press surface of the fastening device until the locking device reaches a locked position retaining the electrical terminal on the post, the spring is at least partially loaded in the locked position.

18. The method of claim 17, wherein a direction for fitting the electrical terminal and the fastening device on the post is parallel to the locking direction and a longitudinal central axis of the post.

19. The method of claim 17, wherein the locking device includes a through orifice adapted for the post to pass through, the through orifice has a shape obtained by partially overlapping a pair of circles of different diameters.

20. The method of claim 19, wherein, in the fitting step, a center of the circle with the larger diameter is aligned with a longitudinal central axis of the post.

21. The method of claim 20, wherein, in the exerting step, a center of the circle with the smaller diameter is aligned with the longitudinal central axis of the post.

22. A method for fastening a fastening assembly to an electrically conducting post, comprising:

providing the fastening assembly including an electrical terminal and a fastening device, the fastening device having a spring and a locking device;

fitting the fastening assembly on the post with the post extending through the fastening assembly, the spring is at least partially in contact with the post; and exerting a pressure in a locking direction on a press surface of the fastening device until the locking device reaches a locked position retaining the electrical terminal on the post, the spring is at least partially loaded in the locked position, the locking direction is transverse to a direction for fitting the fastening assembly on the post and to a longitudinal central axis of the post.

23. A fastening device for fastening an electrical terminal to an electrically conducting post, comprising:

a spring;

a locking device retaining the electrical terminal on the electrically conducting post in a locked position of the fastening device, the spring is at least partially loaded in the locked position;

a press surface, the locked position is reached by exerting a pressure on the press surface in a locking direction;

a hollow shank extending to either side of the fastening device from the press surface toward a surface opposite the press surface in the locking direction, the hollow shank is dimensioned to house the electrically conducting post; and a pair of compression springs, a first spring of the compression springs has a diameter larger than a second spring of the compression springs, in the locked position a direction of a restoring force exerted by the first spring and a direction of a restoring force exerted by the second spring are parallel with respect to each other and to a longitudinal central axis of the hollow shank.

* * * * *